Oct. 15, 1940.   R. D. BENNETT ET AL   2,217,784
CONTAINER FABRICATING MACHINE
Filed April 23, 1938   16 Sheets-Sheet 1

Inventors
Racy D. Bennett
Charles Z. Monroe,
By Watson, Cole, Grindle & Watson
Attorney

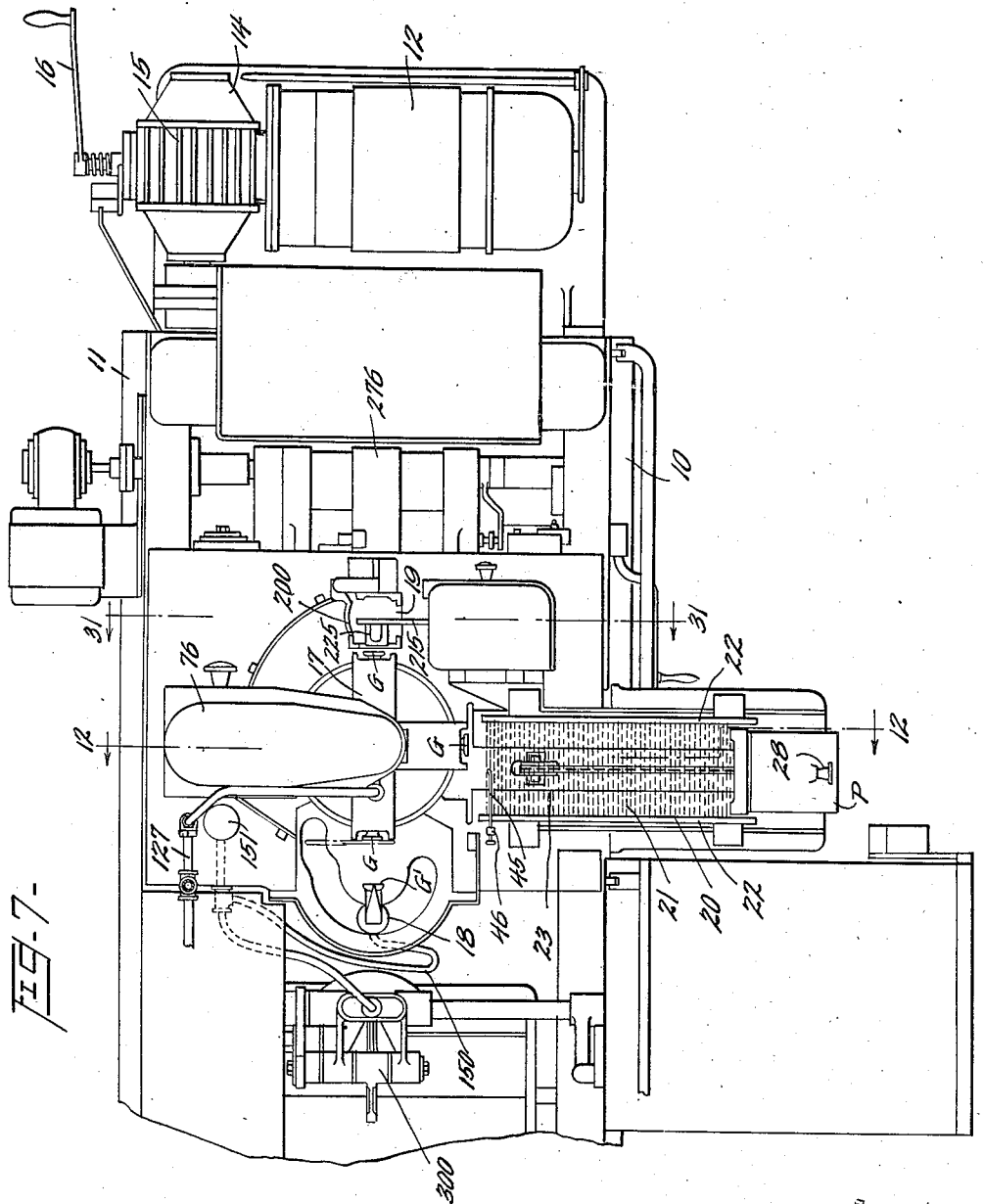

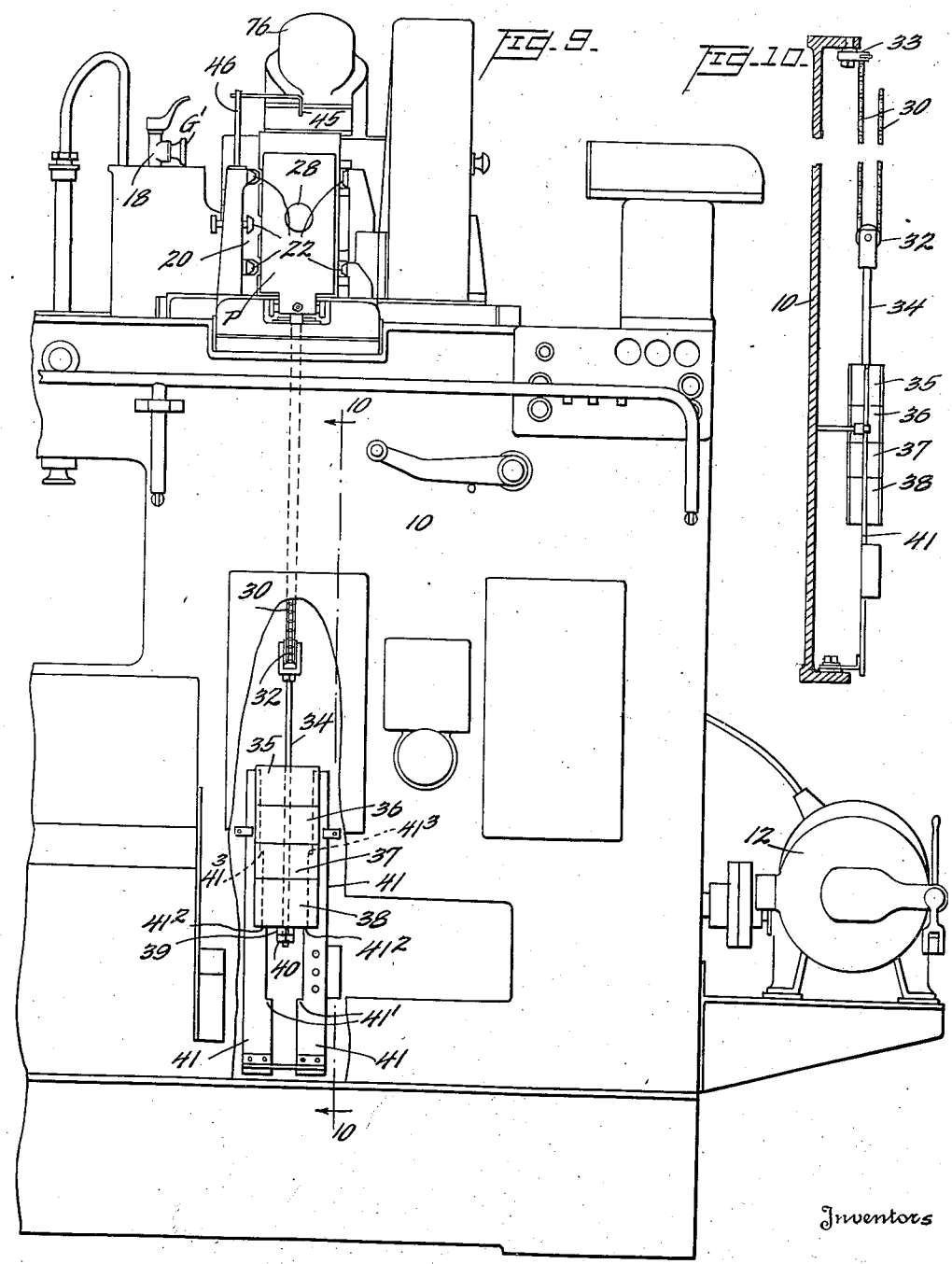

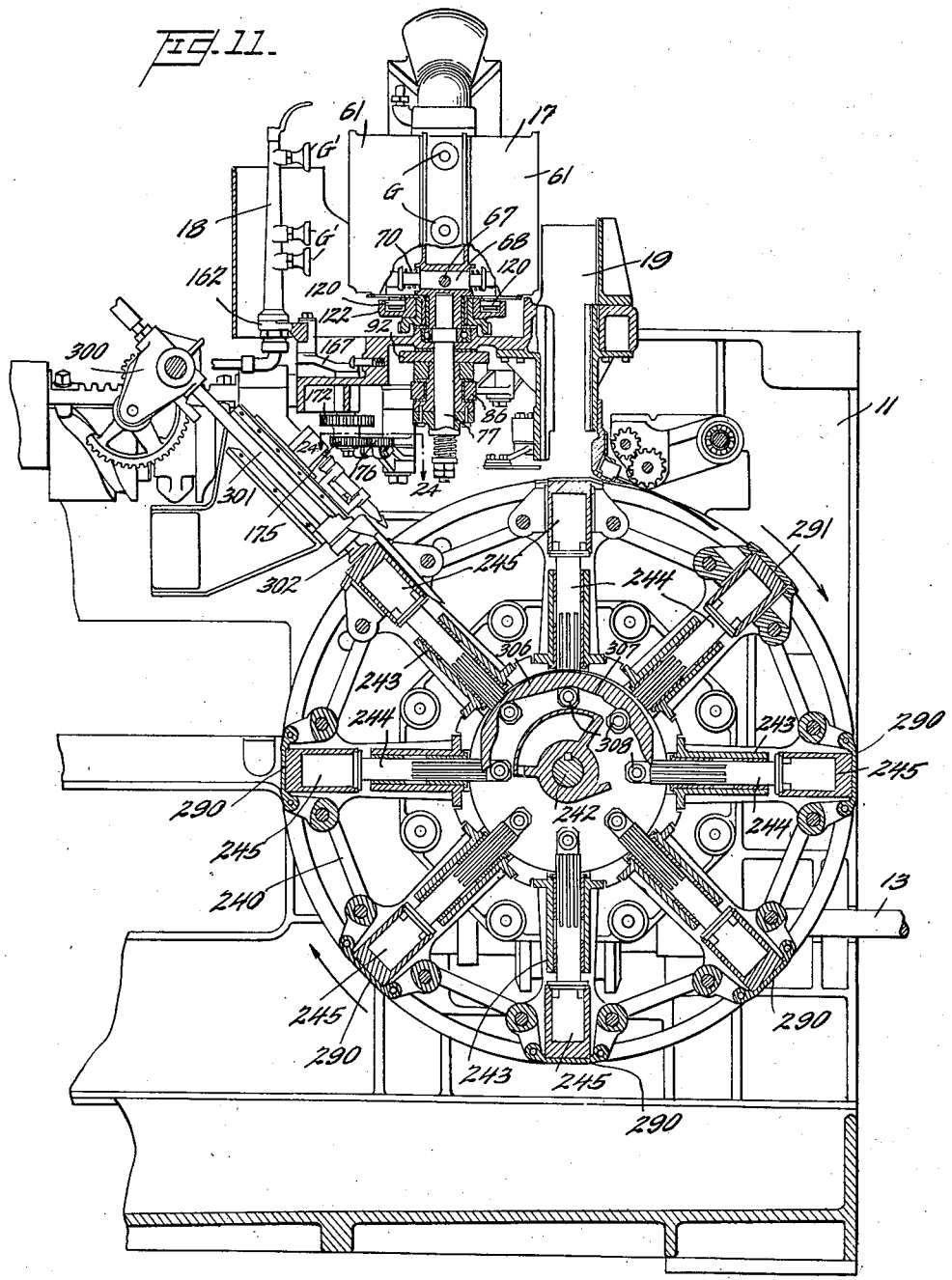

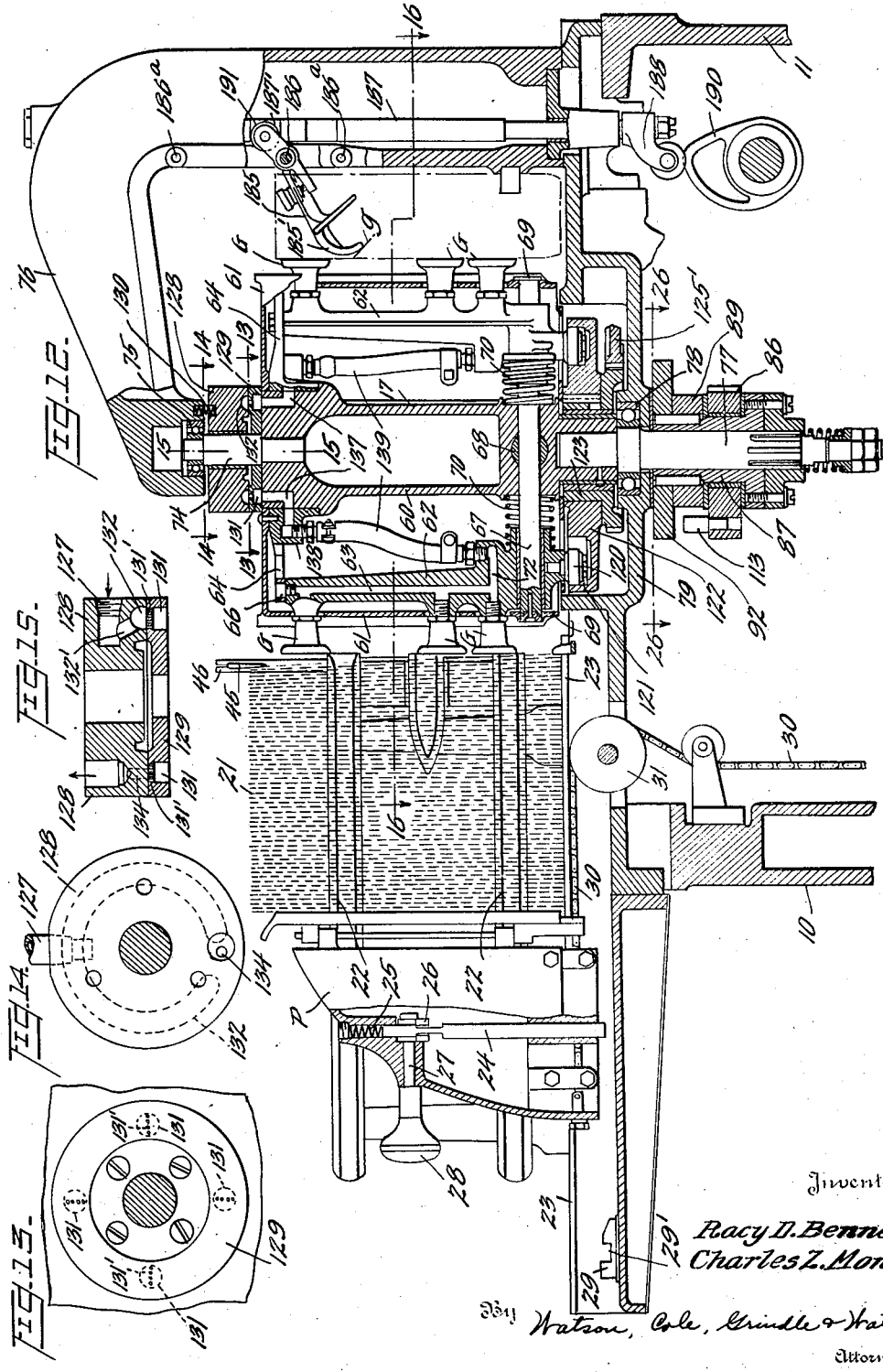

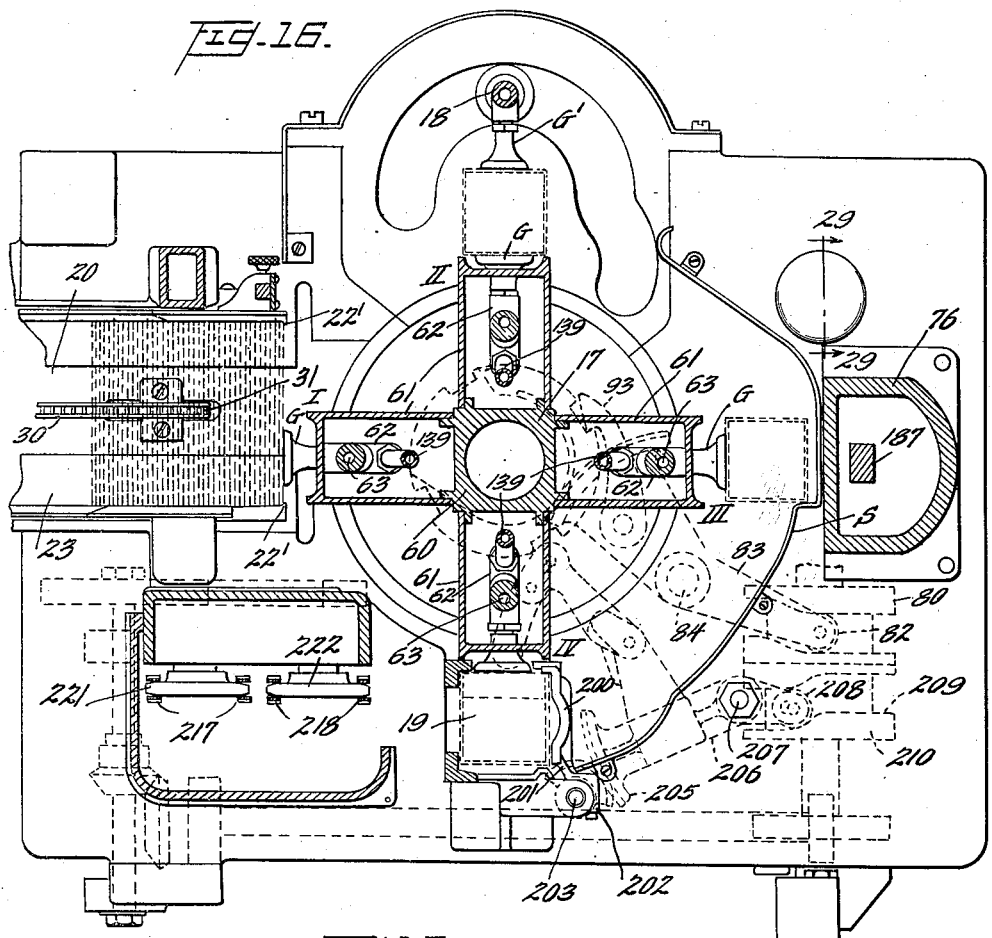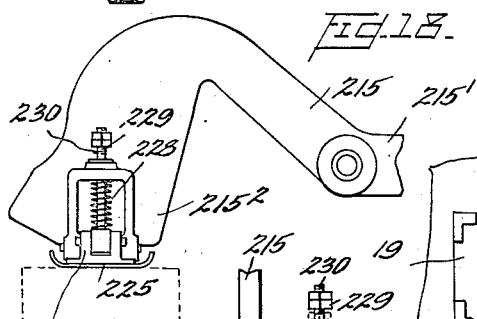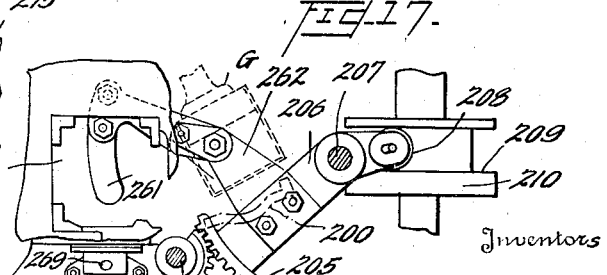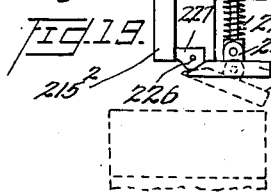

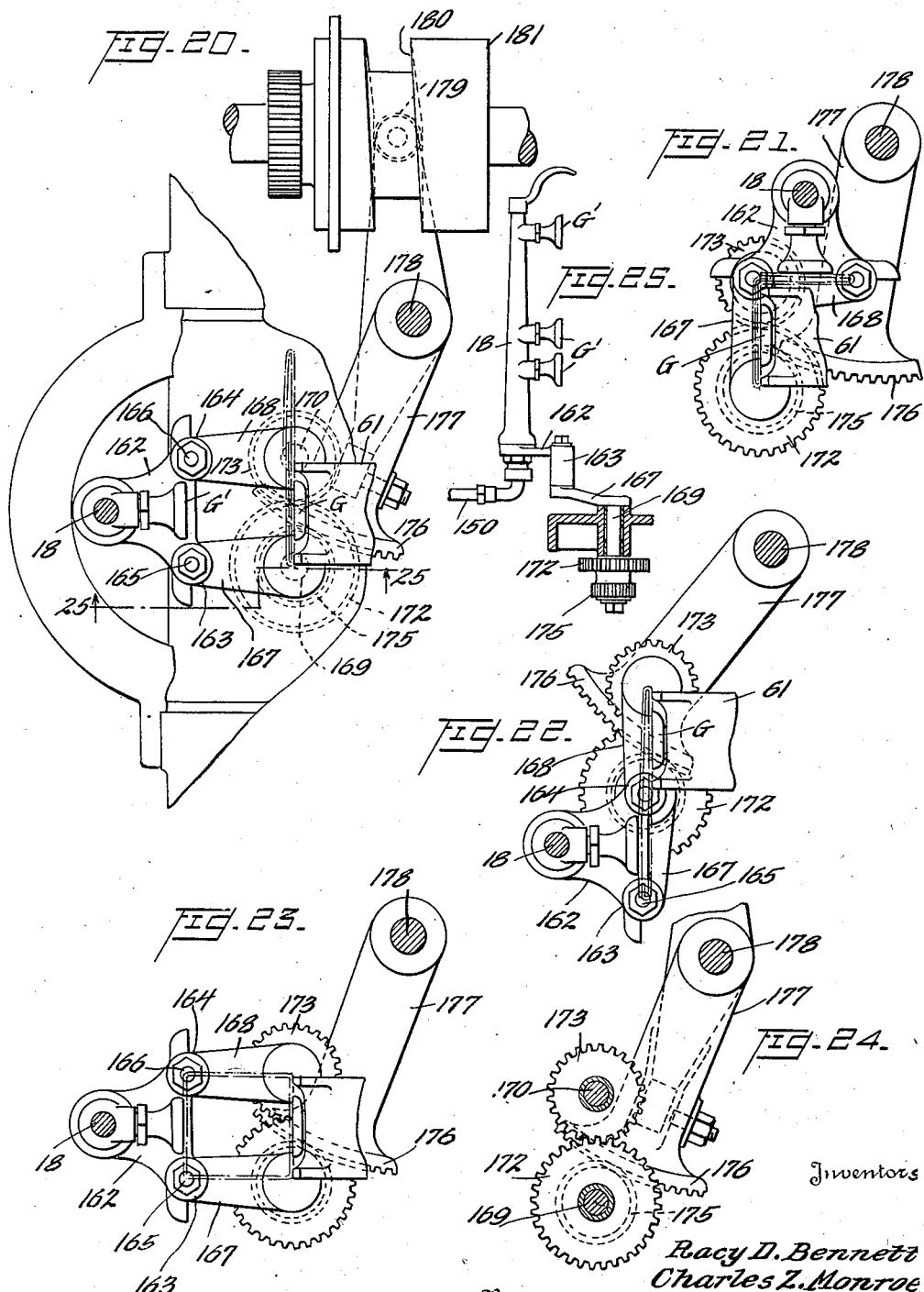

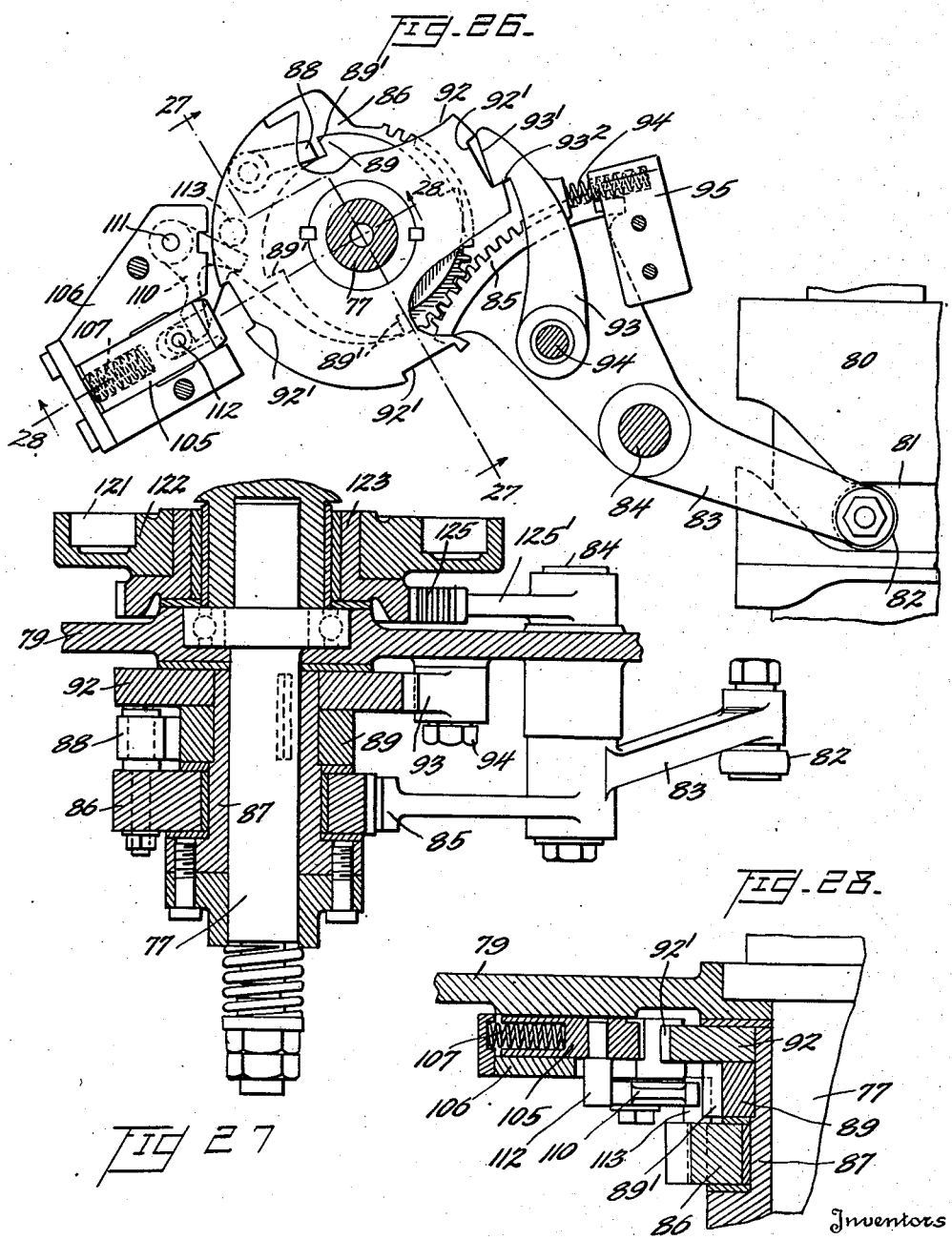

Oct. 15, 1940.  R. D. BENNETT ET AL  2,217,784
CONTAINER FABRICATING MACHINE
Filed April 23, 1938  16 Sheets-Sheet 10
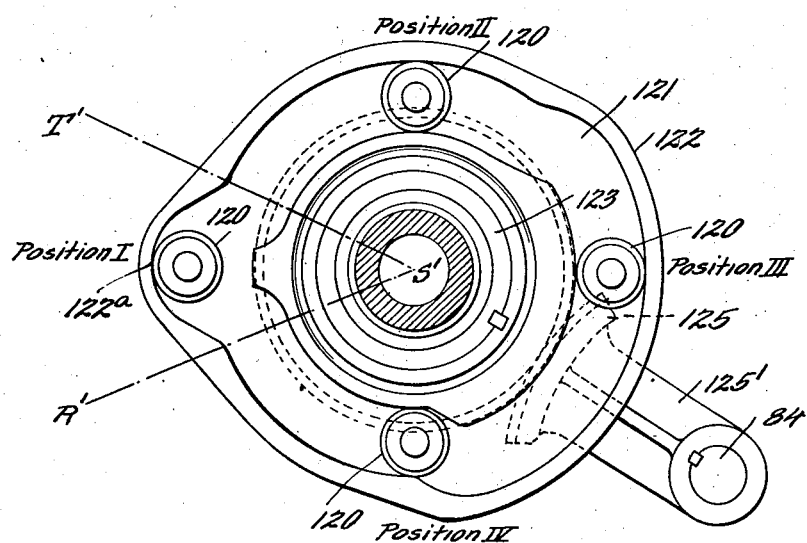
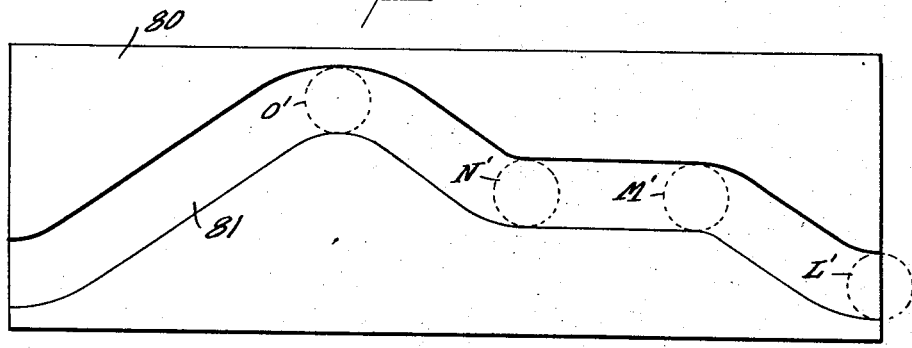
Inventors
Racy D. Bennett
Charles Z. Monroe,
By Watson, Cole, Grindle & Watson
Attorney

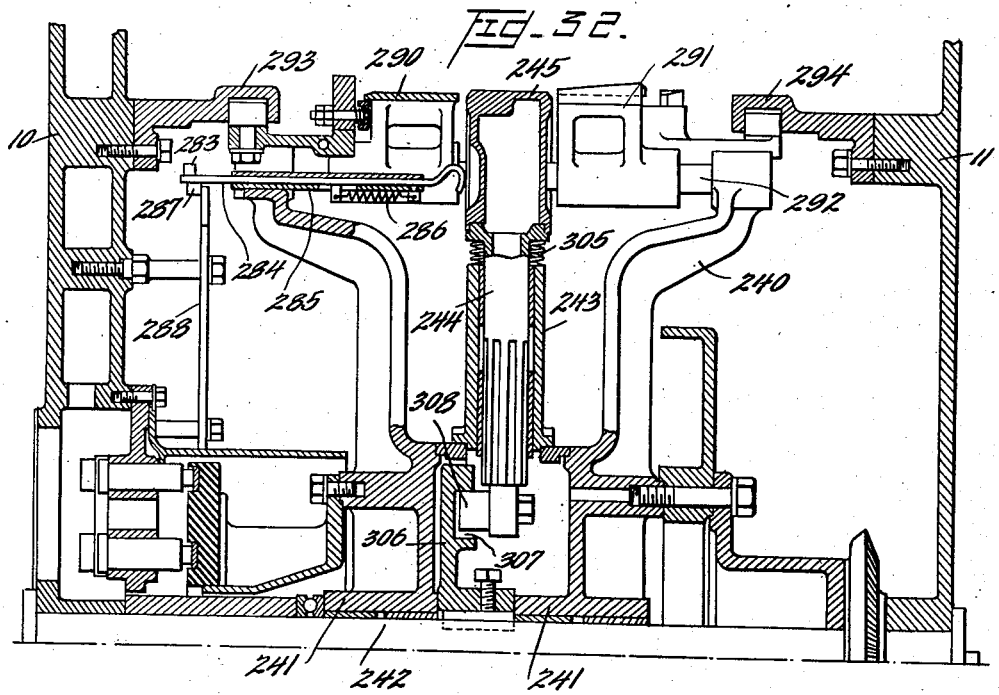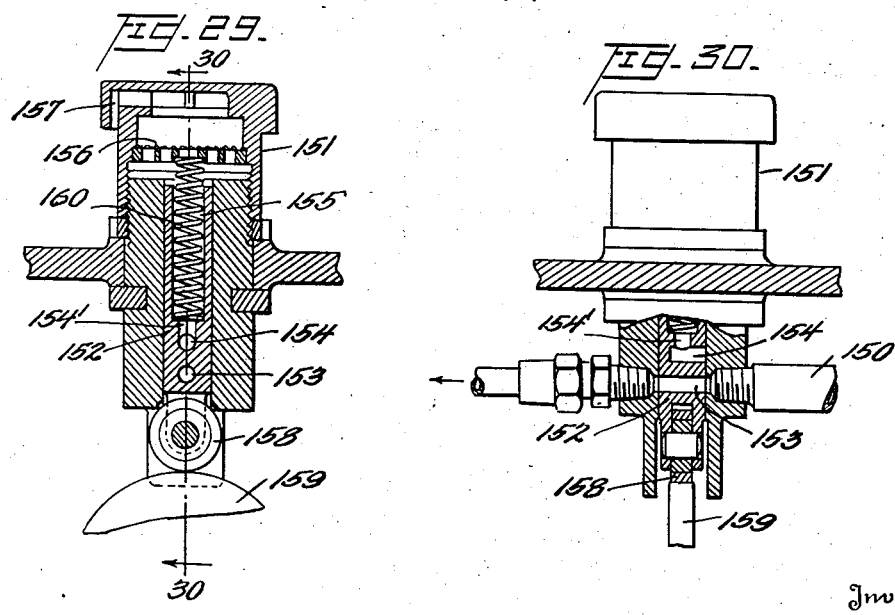

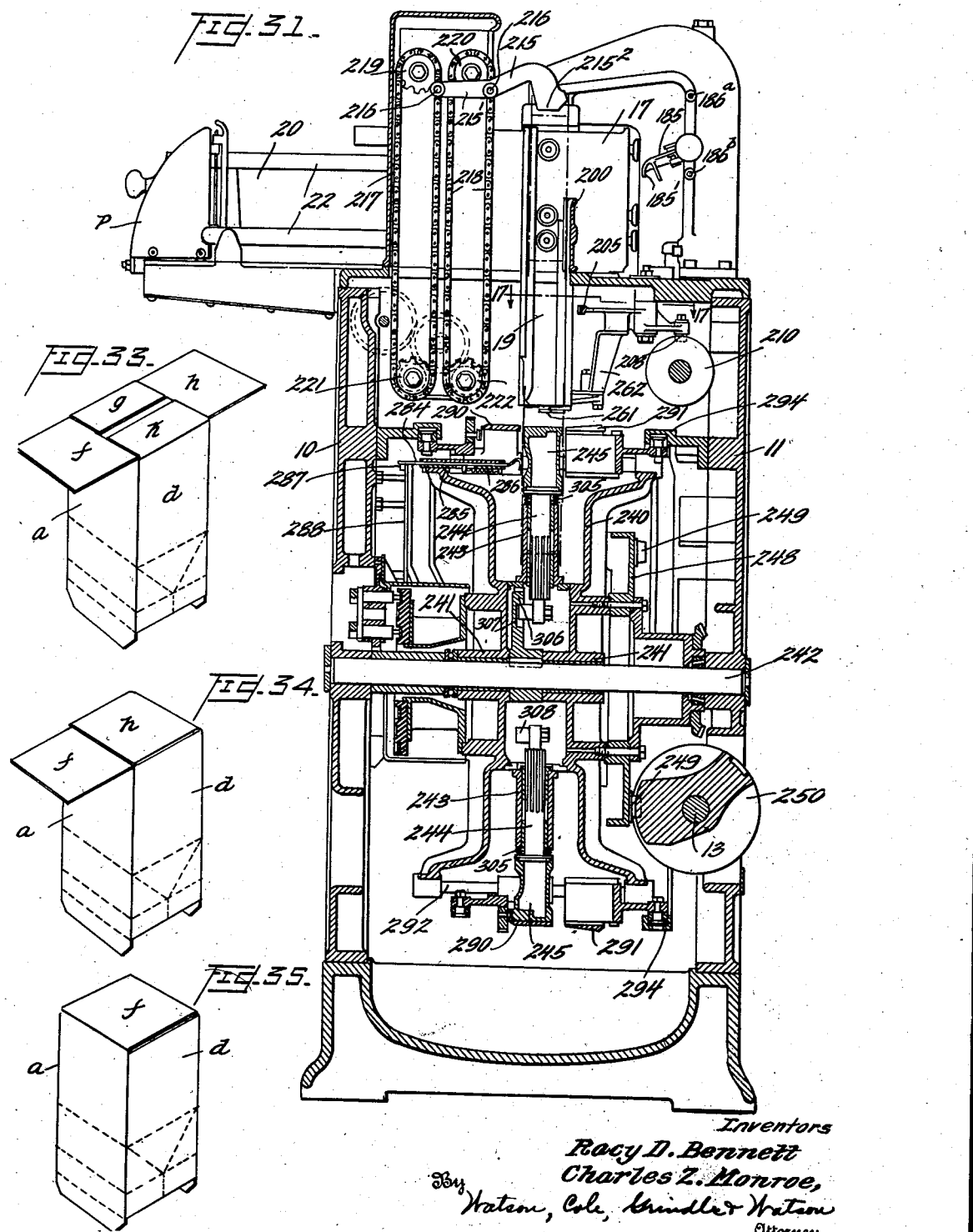

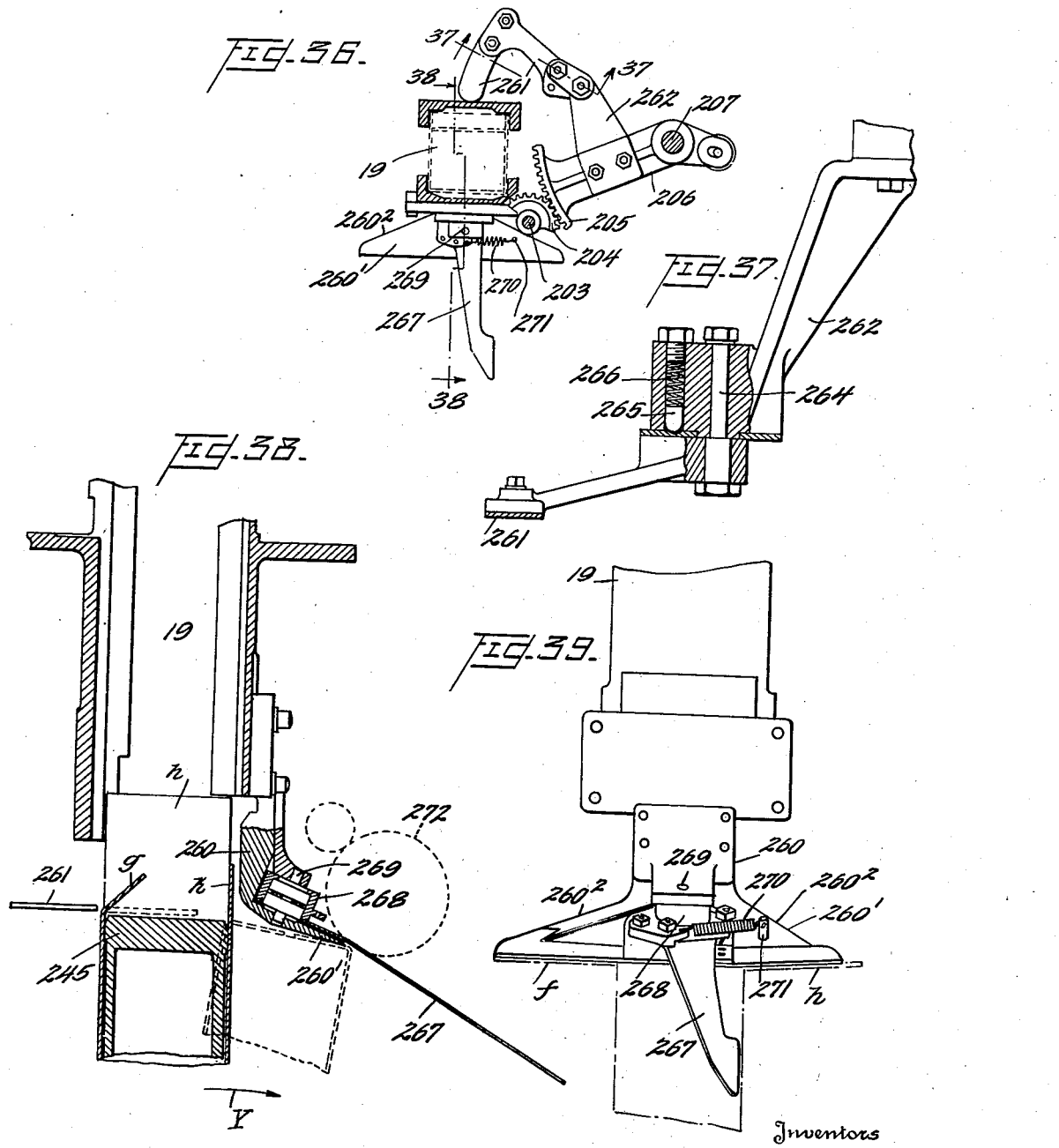

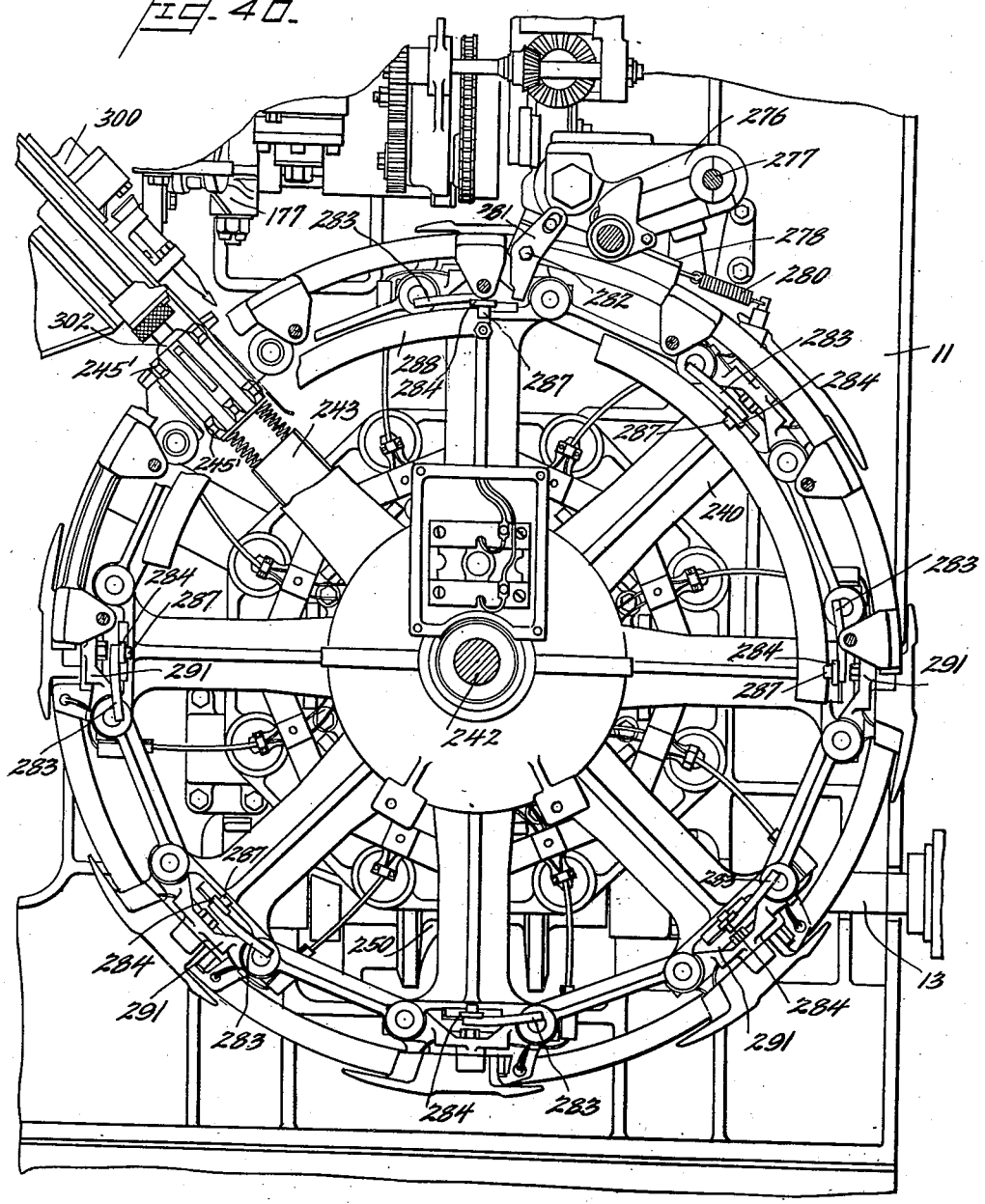

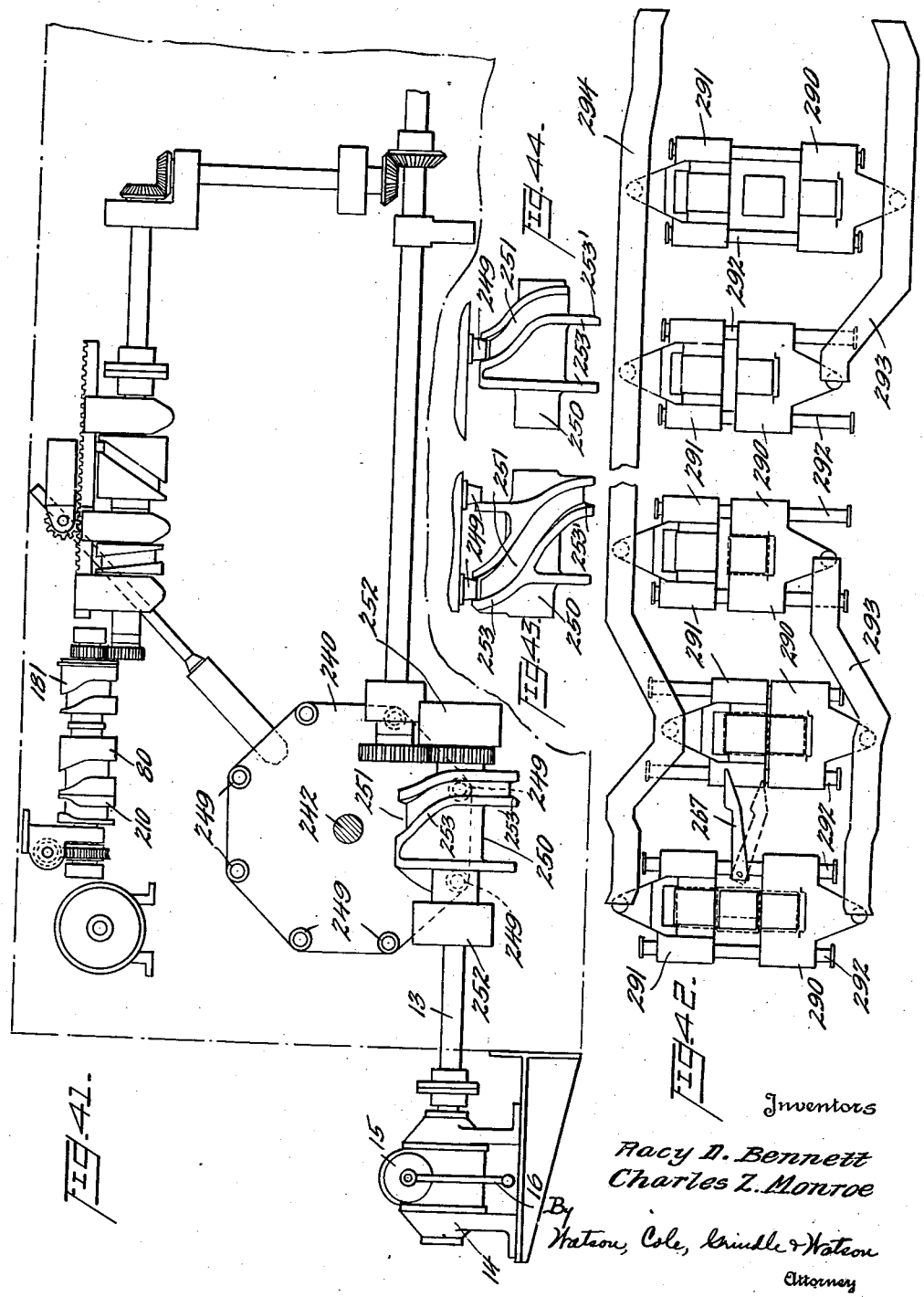

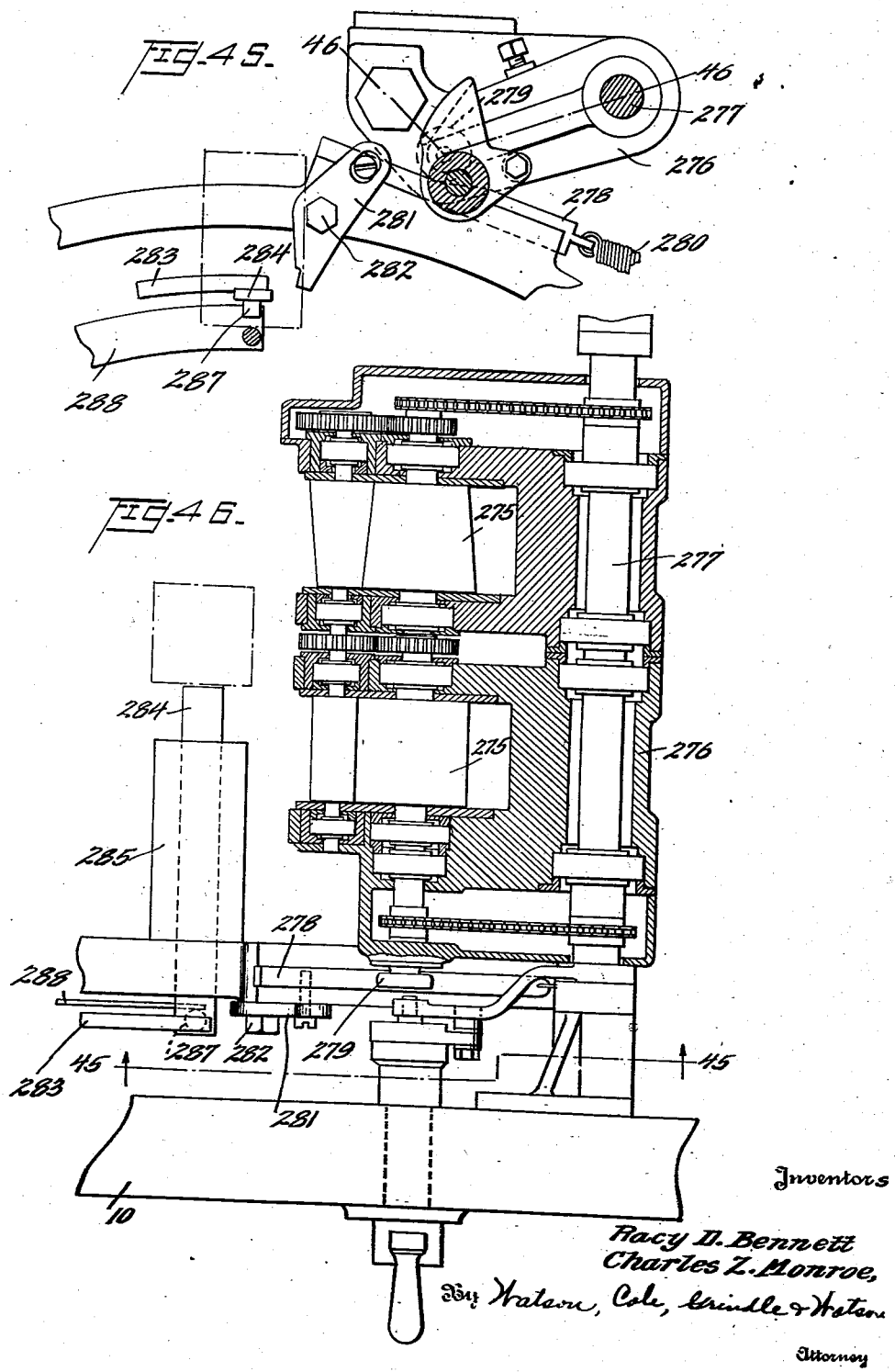

Patented Oct. 15, 1940

2,217,784

UNITED STATES PATENT OFFICE

2,217,784

CONTAINER FABRICATING MACHINE

Racy D. Bennett and Charles Z. Monroe, Detroit, Mich., assignors to The American Paper Bottle Company, Toledo, Ohio, a corporation of Ohio Application April 23, 1938, Serial No. 203,934

31 Claims. (Cl. 93—44.1)

The present invention relates to methods of and apparatus for fabricating paper containers.

In Patent 2,047,891 granted July 14, 1936, to Henry T. Scott is disclosed a paper container of the self-supporting type, well adapted for the packaging, transportation and dispensing of commodities in either solid or liquid form but particularly suited for use in packaging and vending liquids. This container is made of good quality, relatively stiff, paper and is of the self-supporting type. When coated interiorly, and preferably also exteriorly, with a suitable composition to prevent penetration of moisture into its fibrous walls, it has the capacity to retain liquids for long periods of time without weakening or bulging and is now widely used as a milk container or bottle, having numerous advantages over the well-known glass bottle and also over paper containers of other types.

The container disclosed in the aforementioned patent is of tubular form and is rectangular in cross-section, having a flat bottom and a peaked top terminating in a central transversely extending multi-ply rib. The initial step performed in the formation of the container is to cut from a paper sheet a flat blank of the desired shape and size. Either simultaneously with the cutting, or subsequently to cutting, as desired, the blank is divided into a plurality of panels by grooving or scoring the same upon one face, the grooves or score lines being formed in that surface of the blank which is to eventually become the outer surface of the container. Thereafter the several panels may be folded relatively to each other into the form of the completed container, glue being applied to various areas to effect the permanent attachment of these areas to other areas of the blank to enable the container to permanently maintain its shape.

The blanks may be formed into completed containers by a series of hand operations but of course it is to be preferred that this be done with the aid of automatic machinery in order that the cost of container production be minimized and uniformity of product secured. An automatic machine for receiving and acting upon blanks of the aforementioned type, relatively folding the panels, glueing the bottom panels, coating it exteriorly and interiorly with a leak-proofing composition, charging it with a liquid, and closing and sealing the same, has heretofore been devised, this complete machine comprising a plurality of mechanism for performing the necessary operations in the desired sequence, blanks being supplied by an attendant to this machine at one point and the completed and filled containers being delivered at another, no hand operation intervening. Prior to the introduction of the blanks into the machine each is doubled upon itself and its overlapping ends are secured together by an adhesive, the flat blanks being thus made into the form of collapsed tubes.

The unit of the automatic machine which first acts upon the collapsed tubular blank functions to square the blank or render it truly tubular in form and of rectangular cross-section and to then inwardly fold its bottom flaps, of which there are four, after the application of glue to certain areas thereof, so that a multi-ply durable bottom is formed, after which the container thus partially completed is delivered to a second unit where it is coated both inside and outside, the charging opening of the container of course having not been previously closed.

The present invention relates particularly to the blank squaring and bottom forming unit of the complete machine and its object is to provide an improved blank squaring and bottom closing mechanism whereby collapsed tubular blanks can be more rapidly and efficiently squared and a more precisely fashioned, partially formed container, ready for charging, obtained. The invention likewise contemplates the provision of a novel method to be followed in squaring the collapsed tubular blanks, whereby the most advantageous results may be obtained. Both method and apparatus will be hereinafter described in detail, a preferred form of the apparatus being illustrated in the accompanying drawings, the drawings also including various views showing the blank which is to be acted upon by the apparatus and the container in various stages of completion.

In the drawings:

Figure 7 is a top plan view of the blank feeding, squaring, bottom folding and glueing unit;

Figure 8 is an end elevation of this unit;

Figure 9 is a side elevation of the same, partially broken away;

Figure 10 is a section on line 10—10 of Figure 9;

Figure 11 is a longitudinal vertical section through the center of the unit;

Figure 12 is a section on line 12—12 of Figure 7;

Figure 1:
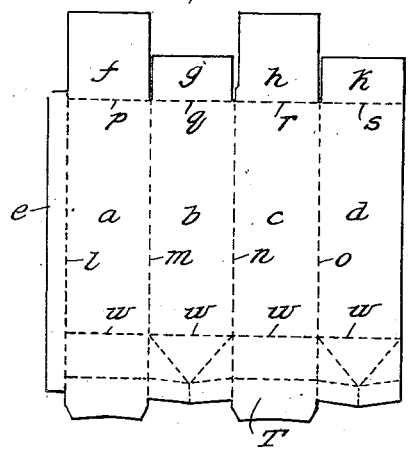
Figure 1 is a plan view of a flat paper blank which has been cut to the desired form and scored.

Figures 13, 14 and 15 are sections on lines 13—13, 14—14 and 15—15 respectively, of Figure 12;

Figure 16 is a section on line 16—16 of Figure 12;

Figure 17 is a section taken approximately on line 17—17 of Figure 31, additional parts above the plane of section 17—17, however, being also shown in order to illustrate the cooperative relationship of parts in different horizontal planes;

Figures 18 and 19 are rear and side elevations of portion of a pusher device which is employed to advance partially completed containers;

Figure 20 is a plan view of portion of the container blank squaring mechanism and the means for actuating the same, the collapsed blank being indicated in chain lines;

Figure 21 is a generally similar view, certain parts being omitted, but the essential blank squaring elements being shown and in positions different from those which they are shown to occupy in Figure 20, the blank in this view also shown in chain lines;

Figure 22 is essentially similar to Figure 21 showing the blank squaring elements in a third position, and the blank in a corresponding position;

Figure 23 is a similar view showing the blank squaring elements and the blank in their final positions;

Figure 24 is a section on line 24—24 of Figure 11;

Figure 25 is a side elevation of one of the blank squaring members, also showing portion of the means for actuating the same;

Figure 26 is a section on line 26—26 of Figure 12;

Figure 27 is a section on line 27—27 of Figure 26;

Figure 28 is a section on line 28—28 of Figure 26;

Figure 28a is a plan view of a cam and its operating mechanism;

Figure 28b is a developed view of another cam;

Figure 29 is a section through a valve, taken on line 29—29 of Figure 16;

Figure 30 is a partial section, taken on line 30—30 of Figure 29;

Figure 31 is a section on line 31—31 of Figure 7;

Figure 32 is a partial section along line 31—31 of Figure 7, on an enlarged scale;

Figure 33 shows in perspective the squared blank with two bottom flaps folded into final position and two others just prior to folding;

Figure 34 is a similar view showing a third bottom flap folded into final position;

Figure 35 shows the squared blank with all bottom flaps folded and secured, the partially formed container shown in Figure 35 being the finished product of the apparatus comprising the present invention;

Figure 36 is a horizontal section taken through the chute through which the squared blank is passed to the bottom folding mechanism, showing in plan portion of this bottom folding mechanism;

Figure 37 is a section on line 37—37 of Figure 36;

Figure 38 is a section on line 38—38 of Figure 36;

Figure 39 is a side elevation of that portion of the mechanism which is shown in section in Figure 36;

Figure 40 shows in side elevation and on an enlarged scale the bottom closing and sealing portion of the mechanism;

Figure 41 shows in side elevation a portion of the driving mechanism for the several operating parts of the unit;

Figure 42 shows in developed plan (with central portion omitted) certain elements of the bottom closing and sealing mechanism and the camming means for effecting movements of these elements in the operation of the unit;

Figures 43 and 44 are additional side elevations of the camming member shown in Figure 41, this member being illustrated in different positions;

Figure 45 is a vertical section taken through portion of the mechanism for applying liquid adhesive to the bottom flaps of the squared container just prior to closing of the bottom, this section being taken on line 45—45 of Figure 46;

Figure 46 is another section through this adhesive distributing mechanism, taken on line 46—46 of Figure 45.

Figure 2:
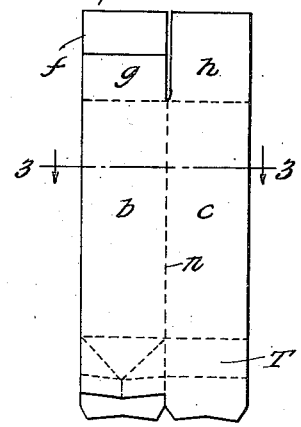
Figure 2 is a plan view of the blank after it has been doubled and its ends secured together by an adhesive, this figure showing the blank in the form in which it is supplied to the machine and which is hereinafter stated to be in collapsed tubular form.

The collapsed tubular paper blank which the machine, now to be described, is intended to receive at its input end is shown in plan in Figure 2 and the partially completed container which is the product of the machine is shown in perspective in Figure 35, it being the function of the machine, as has previously been pointed out, to square out blanks of the type shown in Figure 2 and to fold and secure the bottom flaps thereof, no operations being performed upon the top of the container, which is subsequently to be closed and sealed by other means.

The original blank as cut from a larger, and scored, sheet is shown in Figure 1 in a flat or developed form. It comprises a plurality of panels and intermediate scored portions, the rectangular panels $a$, $b$, $c$ and $d$ eventually becoming the side wall panels of the finished container and the rectangular flaps $f$, $g$, $h$ and $k$ comprising the bottom flaps which, when folded and secured together, form a three-ply bottom. The scored portions of the container are indicated in dotted lines, the scorings $l$, $m$, $n$ and $o$ defining the edges of the side wall panels $a$, $b$, $c$ and $d$ and the scoring $l$ also defining one edge of the end flap $e$, which flap overlaps, in part, the panel $d$ when the blank is folded to form the collapsed tube shown in Figures 2 and 3.

The scoring $p$, $q$, $r$ and $s$ divide the panels from the bottom flaps and the aligned scorings $w$—$w$ constitute the line of demarcation between the side wall panels $a$, $b$, $c$ and $d$ and the various panels which together comprise the foldable container top, this foldable top portion being indicated in its entirety by the letter T. All of the scorings are impressed in that surface of the blank which is to eventually be the outside surface of the container so that it is clear that when the blank is squared, the ribs formed on one surface of the blank by the scoring operation will be within the container. At least the scorings $l$, $m$, $n$ and $o$ are formed in that face of the blank which is eventually to form the outside surface of the container in order that there may be within the interior of the completed container, at the corners thereof, small longitudinal ribs or fillets instead of sharp right angles. It is found that a container so formed retains coating material applied interiorly thereto more satisfactorily than it will where the scorings are impressed in that surface of the blank which is ultimately to become the inside surface of the container. The side panels $a$, $b$, $c$ and $d$ are always of equal length but vary in length in containers of different capacities. The blank shown is for a quart size container. If a pint or half pint container is to be made, the blank is cut with correspondingly shorter panels. The machine is so constructed that it will receive, square out and secure the bottoms of blanks of various sizes in the fabrication of containers of different capacities. The top and bottom flaps remain the same for all sizes of blanks.

Figure 3:
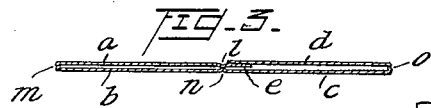
Figure 3 is a section on line 3—3 of Figure 2.
Figure 4:
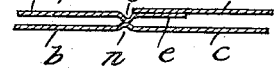
Figure 4 is an illustration, upon an enlarged scale, of the central portion of the blank as shown in Figure 3.
Figure 5:
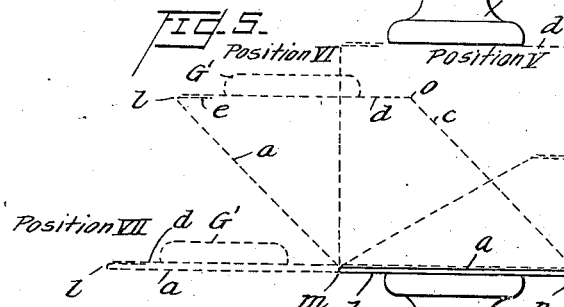
Figure 5 is a diagrammatic view in which the collapsed tubular blank is indicated in full lines in the condition in which it is received by the squaring unit, and in dotted lines in various of the successive positions which it is caused to occupy while the squaring operation is being performed.

After the blank shown in Figure 1 has been folded and the flap $e$ attached to panel $d$ the collapsed tubular blank thus formed is, in cross-section, as shown in Figures 3 and 4, with the inwardly projecting scored portion $l$ in contact, or substantial contact, with the scored portion $n$. In this form the blank may be readily packed for shipment from its point of manufacture to the point at which it is to be squared and used. In Figure 5 of the drawings a collapsed tubular blank of the type just described is indicated in full lines in the condition in which it is received and before any squaring operation has been performed thereon. A suction device indicated diagrammatically at G is shown to be in contact with panel $b$ of the blank and a second suction device, diagrammatically shown at G', is in opposed relationship, or faces, the suction device G, the distance between these suction devices being equal to the width of a side panel of the blank measured transversely of the side panel. Means hereinafter to be described is provided for actuating the suction device G' in such manner that it may be moved from the position in which it is shown in full lines successively to the various positions in which it is indicated in dotted lines. While the blank is thus held between gripping or suction devices G the suction device G' is given an initial movement to the right, along an arc centered upon a vertical axis passing through the midpoint of panel $b$, which is the panel which is grasped and supported by the suction device G. Arcuate movement of suction device G' to the right brings this device into contact with the panel $d$, the position of such a device G' at the time of contact with panel $d$ being indicated by the legend "Position I" in Figure 5. Movement of the suction device G', however, is not halted at this point but is continued until it has moved through Position II to Position III, pushing panels $d$ and $c$ ahead of it and flexing the score lines $n$ and $o$. It may be mentioned that the panel $b$ is supported by means (which is not illustrated in Figure 5) in addition to the suction device G, during this folding operation, so that the folding will unquestionably occur along the score lines $n$ and $o$ and not elsewhere, and it may be added that when the suction device G' reaches Position III, the panel $c$ lies against a flat abutment. After reaching Position III retraction of the suction device G' immediately commences and this suction device then passes in a counterclockwise direction (as seen in Figure 5) from Position III through Position II and I, and also through Positions IV, V and VI to Position VII, which is 180° removed angularly from Position I. During all of this time panel $d$, opposed to panel $b$, is securely gripped and held by the suction device G' so that this panel will successively occupy the positions in which it is shown in dotted lines. Likewise the panels $a$ and $c$ will swing through the angular positions indicated in dotted lines, the blank maintaining its parallelogram form in cross-section during all positions intermediate Positions I and VII.

Figure 6:
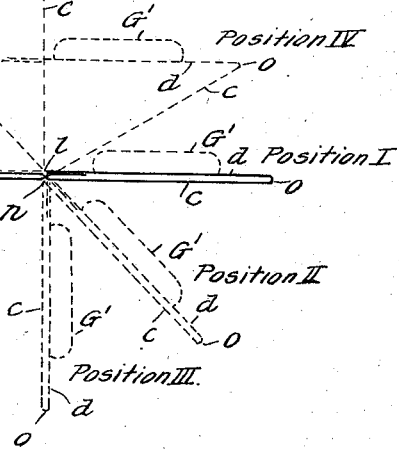
Figure 6 is a perspective view of the partially finished container, after having been squared and made ready for the bottom folding and sealing operation.
Figure 6:
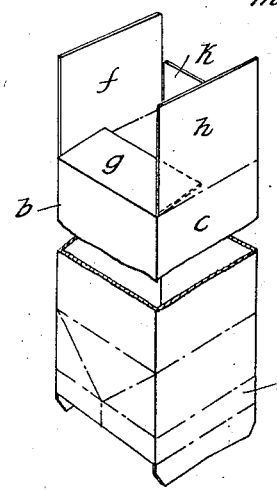
Figure 3:
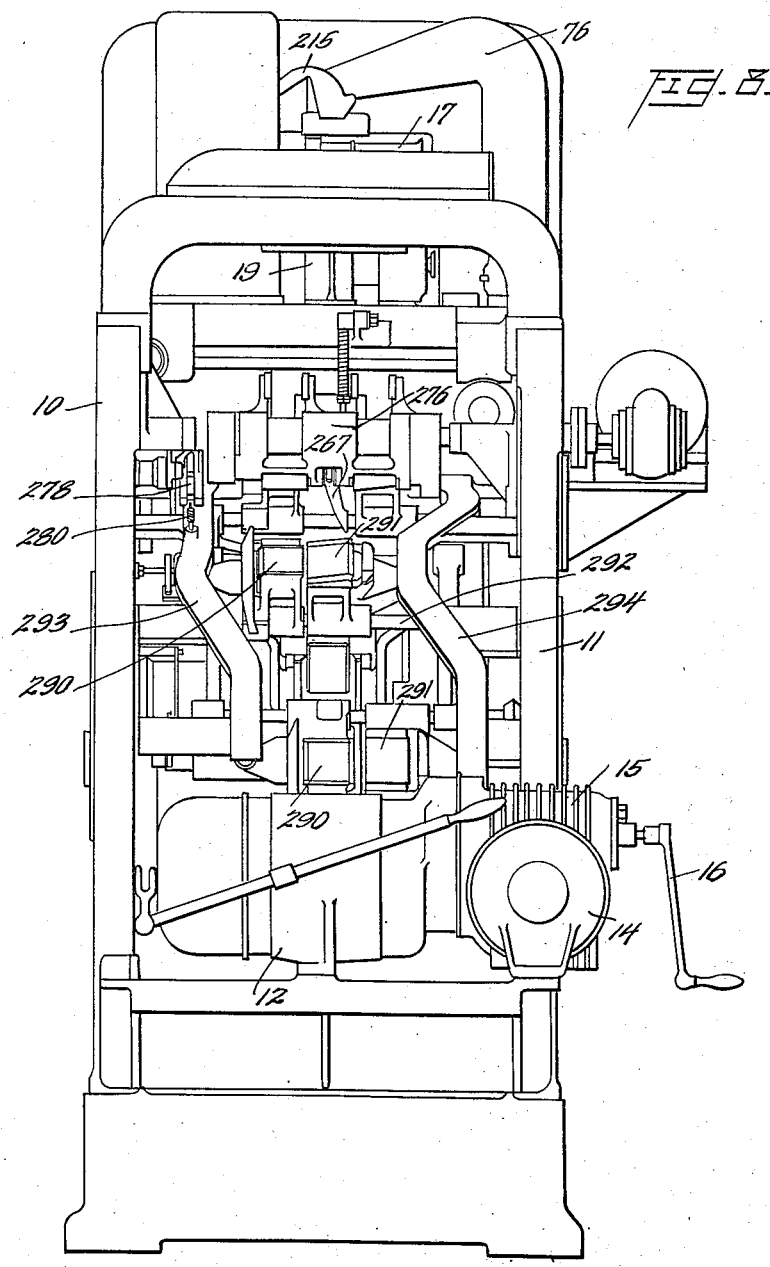

After suction device G' has reached Position VII its direction of motion is again reversed and it moves in a clockwise direction back to its final position, which corresponds to Position V, where its movement is halted. Obviously during the movement of the blank through the various positions which have just been described the scored portions intermediate the side wall panels, which portions hingedly connect the panels, are all reversely flexed and after the series of movements have been completed the collapsed blank may be said to have been squared since, by reason of the flexure of the hinge or scored portions, the fibers comprising these portions have been so worked that the blank as a whole, after being released by the suction devices G and G', will maintain its square or rectangular configuration or at least will closely approximate this configuration. It is then ready to be passed on to the bottom closing portion of the mechanism, at least after a single further operation has been performed, i. e., the downward deflection of the minor bottom flap $g$ from its original position to the position in which it is shown in panel $b$ to the position in which it is shown in Figure 6. The mechanism for feeding blanks to the machine, squaring these blanks in the manner indicated, and downwardly folding the minor end flap $g$, is illustrated in the first thirty-one figures of the drawings and this mechanism will now be described in detail.

All parts of the complete unit are of course suitably supported upon a frame and this frame may be of any desired type or construction. It will not be described in detail other than to say that its principal elements comprise the parallel side members indicated at 10 and 11 in the drawings. The side members are connected at various points by webs, plates and rods, and certain of the rotating shafts comprising elements of the mechanism have their ends supported in bearings mounted in the side members.

A driving motor is indicated at 12 and this motor drives the main longitudinally extending drive shaft 13 through speed reduction and power transmission mechanism enclosed within the casing 14. Superposed upon casing 14 is a smaller casing 15 within which is means for connecting the drive or power shafts 13 to the hand crank 16 to permit manual operation of shaft 13 when the motor is inoperative. The shaft 13 extends longitudinally of the machine and serves to drive a number of actuating cams from which power for the operation of numerous of the operating parts of the mechanism is taken, the driving connection between shaft 13 and these cams being shown in Figure 41.

In Figure 7 the suction devices G and G' previously referred to are shown, a blank being engaged by the suction device G. There are four such suction devices, of which three may be seen in this view, being angularly disposed at angles of 90° with respect to each other and projecting, respectively, from the four wings of a rotatable turret which is generally indicated at 17. The suction device G' is mounted upon a blank squaring member indicated at 18. A chute is generally indicated at 19, this chute extending vertically downwardly toward the container bottom folding and glueing mechanism, which cannot be seen in Figure 7. Each blank is acted upon and squared at a point diametrically opposite the chute, i. e., upon the opposite side of the turret 17 and, after the squaring operation has been completed the squared blank is moved in a clockwise direction by the turret and into the upper end of the chute 19 down which it is moved to be further operated upon by the bottom folding mechanism.

A supply of blanks is maintained in a magazine which is generally indicated at 20 and in the operation of the squaring mechanism individual blanks are removed successively from the pack of blanks in the magazine, squared, presented to a member which effects inward folding of a minor bottom flap, and delivered to the chute 19, the magazine including a pusher or feeding element P which advances the pack automatically as blanks are removed singly from the inner end of the pack. This magazine will first be described in detail, being shown in Figures 9, 10 and 12.

A pack of collapsed tubular blanks is indicated at 21 in Figure 12, these blanks being disposed in parallel relationship with adjacent faces in close contact and being inverted, the bottom flaps of each blank being uppermost. The pack is laterally confined between parallel side rails 22 and rests upon a flat longitudinally slotted bottom plate 23. The details of the pusher P are shown in Figure 12, this pusher having a central portion which projects downwardly through the slot in bottom plate 23 and portions to either side of this central portion which rest upon the upper surface of the bottom plate to either side of its central slot. The pusher includes a latch bolt 24 normally pressed downwardly by a spring 25 and which may be raised by means of a bifurcated lifting arm 26, the parallel portions of which engage downwardly facing shoulders formed on latch bolt 24 by cutting away or recessing this latch bolt upon opposite sides, lifting arm 26 having the end thereof remote from the latch bolt fixed upon a shaft 27 rotatably supported by the pusher, the shaft 27 and the arm 26 being adapted to be rotated by an operator when the operating handle 28 is rotated. A catch for receiving and holding the lower end of latch bolt 24 is indicated at 29 and when the pusher is drawn rearwardly (to the left Figure 12) the lower end of the latch bolt will ride upwardly over the inclined end of this catch and thereafter move downwardly into the notch 29' so as to be automatically locked in this position. The pusher will of course be released for forward movement when the operator lifts latch 24 by rotating handle 28.

To the lower end of the pusher, i. e., the portion which projects downwardly through the slot in plate 23, is attached the end of a chain 30, this chain passing over a guide roller 31 and thence downwardly and around a pulley 32, the end of the chain being permanently secured to the frame by the securing device 33 shown in Figure 10. Suspended from the pulley 32, which is of course wholly supported by the chain 30, is a rod 34 which passes through aligned cylindrical apertures formed in four superposed weighting elements indicated at 35, 36, 37 and 38, respectively, an abutment nut 39 and adjusting nut 40 being threaded on the lower end of rod 34. The weights just referred to are slotted upon opposite sides to receive the vertically disposed plates 41. The slots formed in the several weighting elements are, measured horizontally, of varying depths and, as will be perceived from an inspection of Figure 9, the parallel plates 41 are stepped, each plate having three steps or ledges, these steps being arranged in pairs and being indicated at $41'$, $41^2$ and $41^3$, respectively. The slots formed in the uppermost weighting element 35 are comparatively shallow and, as rod 34 descends, this element will come to rest upon shoulders $41^3$. The slots formed in the weighting element 36 are slightly deeper so that this element will pass shoulders $41^3$ but will, if rod 34 descends sufficiently far, cause weight 36 to strike shoulders $41^2$ and be intercepted thereby. The third weight 37 will be intercepted by shoulders $41'$ but the lowermost weight 38 can descend still further. Hence as rod 34 descends, the upper three weights are successively intercepted and the load imposed upon this rod and the chain 30 is successively decreased so that the pusher 21 will be urged in blank feeding direction with a force which decreases as the pack of blanks in advance of the pusher decreases in extent. It will be appreciated that, due to the frictional engagement of the pack of blanks with the sides and bottoms of the magazine, the resistance to forward motion offered by this pack is substantially in proportion to the number of blanks which it contains. The latching mechanism described is for the convenience of the operator in placing a fresh load of blanks in the magazine. When blanks are to be added to the pack the operator will retract and latch the pusher and maintain pressure against the remaining blanks of the pack with one hand while adding blanks with the other. After the magazine has been charged the operator removes his hand from the pack and again renders the pusher operative.

As may be observed in Figure 16, the side rails of the magazine are provided with small inturned flanges 22' and the small collapsed blank of the pack comes to rest with its edges abutting flanges 22', its forward movement being thus halted. When so positioned the innermost blank may be engaged by one or other of the suction devices carried by the turret and may be withdrawn by such suction device when the suction device is retracted, the edges of the blank snapping past the flanges 22' of the magazine. A downwardly projecting blade-like member, indicated at 45, and which is supported upon a standard 46 to one side of the magazine is positioned to engage the major bottom flaps $h$ of the blanks which pass it in succession for the purpose of slightly deflecting these bottom flaps and disengaging their edges from the adjacent edges of the major bottom flaps $f$ to facilitate the removal of single blanks from the pack.

The rotatable turret previously referred to comprises essentially a central frame 60 and four wing members 61 of identical construction, each indicated, these wing members being hollow box-like members the inner edges of which are rigidly secured to the turret frame 60. The wings are separated angularly 90° from each other and comprise housing for the blank holding and gripping members, respectively, there being four of these members, one within each housing or turret wing, each member being indicated by the numeral 62.

Each such blank holding or gripping member 62 comprises a vertically elongated member which is substantially circular in cross-section and provided with a longitudinally extending bore or duct 63. The upper end of each blank holding member lies between parallel guides 64 extending radially of the turret and the inner ends of which are rigidly secured to the turret frame 60, the parallel faces of a polygonal nut 66 slidably engaging the mutually facing inner surfaces of guide members 64, the arrangement being such that the top of member 63 may freely move radially of the turret but not circumferentially. It will be observed that the threaded shank of nut 66 forms a closure for the upper end of bore 63. The lower ends of the blank holding members 62 are slidably mounted upon supporting rods, there being two of these rods, indicated at 67 and 68, disposed at right angles to each other and of different diameters, the larger rod 68 being apertured at its midpoint to receive rod 67. To the end of each rod is secured an abutment member 69 to limit the outward movement of the adjacent blank holding member and associated with each blank gripping member, and interposed between it and the turret frame 60, is a helical spring 70 always under compression and the function of which is to normally urge the blank gripping member with which it is associated to the outer limit of its travel or into contact with abutment 69.

Mounted upon each blank holding member are three suction devices or cups G the hollow interior of each of which communicates through a horizontal duct with the main bore 63 in the blank holding member. Duct 63 terminates at its lower end in a transverse duct 72 which in turn is alternately placed in communication with a vacuum chamber and with the atmosphere, to render the suction devices G alternately effective and ineffective, by means hereinafter to be described. I preferably employ three suction devices G in association with each blank holder, two to grasp the blank adjacent the lower end of panel b and a third to grip the blank close to the upper end of this panel when the panel is a relatively long one, as in the case of a blank to be fabricated into a container to hold a quart or more. The mechanism is adapted to handle collapsed tubular blanks which are considerably shorter than those which are shown, for instance blanks intended to be fabricated into containers of pint capacity, in which case the upper suction device G may not engage a blank. The two lower suction devices will in such a case be entirely adequate for the purpose intended. Each suction device or cup G is, however, active during the time that the machine is in operation, being constantly in communication with a vacuum chamber or pump. The suction line leading to each suction cup is restricted at a point immediately adjacent the cup, where there is a circular orifice exactly .026" in diameter. The air leakage into the vacuum mains is therefore restricted and controlled so that one or two only of the twelve cups may be active to hold a blank while the remainder are open to the atmosphere. With this arrangement the machine can start to operate without difficulty when a run is to be made and at a time when there are no blanks carried by the turret, and can also successfully deliver the last blank of a run to the chute. It will be observed that the suction devices project through apertures formed in the vertical side walls of the several wing casings 61, these apertures being sufficiently large to permit the suction devices to reciprocate through these apertures freely.

Projecting axially upward from the upper end of the turret frame 60 is a pin or arbor 74 the upper end of which is received within a bearing 75 mounted in a downwardly facing recess formed in the end of a bracket 76 rigidly supported upon the frame. The lower end of the turret frame 60 is mounted upon a vertical shaft or spindle 77 which is supported in a bearing 78 mounted in an upwardly facing circular recess formed in the horizontally disposed frame member or plate 79, the spindle 77 being coaxial with the pin 74 at the upper end of the turret frame so that the turret as a whole is supported for free rotation about the common axis of the spindle and pin.

In the operation of the machine the turret is given an intermittent step-by-step rotatory movement and the means for effecting this movement is positioned beneath the horizontal frame member 79. Such means may be most clearly perceived in Figures 26, 27 and 28. In Figure 26 a short section of power shaft which extends longitudinally of the machine is shown and upon this shaft is mounted a cam 80 having a cam track 81. Within cam track 81 is a roller 82 rotatably mounted upon the end of an operating lever 83 which is supported for pivotal or rocking movement upon pin 84 mounted in frame plate 79. The opposite end 85 of the lever 83 is segmental and is toothed, comprising a circular rack, and the teeth of this rack are in mesh with teeth formed on the periphery of an actuating plate 86 which is mounted for oscillation about the axis of spindle 77, the actuating plate 86 being rotatably mounted upon a sleeve 87 which closely encircles the spindle 77. The actuating plate 86 carries an actuating pawl 88 the free end of which is normally urged inwardly by yielding means, such as a small spring (not illustrated), against an annular ratchet 89 which is keyed to sleeve 87. Rotation of lever 83 in one direction about pin 84 effects rotation of the actuating plate 86 in the opposite direction about the sleeve 87, and when the direction of movement of lever 83 is reversed, the direction of movement of the actuating plate is reversed. When lever 83 is rocked in an anti-clockwise direction (Figure 26), the actuating plate 86 will move in a clockwise direction and the forward end of actuating pawl 88 will engage one of the teeth 89' of the ratchet 89 so that the plate and ratchet will rotate together about sleeve 87. When the direction of movement of the lever 83 and of the actuating plate are reversed, the pawl will slide in an anti-clockwise direction over the face of the ratchet and will assume a position behind one or other of the teeth 89' ready for a further ratchet advancing movement. Means is provided, in addition to the turret advancing mechanism just described, for preventing accidental movement of the turret in a counter-clockwise direction and for insuring that the advancing movement of the turret is halted exactly in a desired position and locked in such position until a further advancing movement is to be effected.

Encircling sleeve 87 and keyed thereto is a locking disc 92 having notches 92' at its quarter points. A pawl 93 mounted for swinging movement about a pin 94 depending from plate 79 has an inclined surface 93' at its forward end terminating in a shoulder 93². Movement of the locking or holding disc 92 in a clockwise direction is in nowise opposed by the pawl 93 which, by virtue of the cam surface 93', is lifted or cammed out of any notch 92' into which it may fall, the pawl thus offering no opposition to free rotation of the locking disc 92 in a clockwise direction. On the other hand it positively locks the plate 92, and hence the turret, against movement in a counter-clockwise direction as soon as its end has entered any one of notches 92'. The free end of the pawl is maintained in constant contact with the edge of locking plate 92 by means of a spring 94 which is retained in the position shown by means of a spring housing 95 also secured to the under-surface of the frame plate 79.

A latch bolt for precisely positioning the turret after each quarter revolution thereof, and locking the turret against movement in either direction during the time that the actuating pawl 88 is being retracted, is indicated at 105. This latch member is slidably mounted in a recess formed in a bracket 106 secured to the under-surface of plate 79 and is normally urged toward the locking disc 92 by a spring 107. Its inner end is wedge shaped and is adapted to enter one or other of the notches 92' of the locking disc 92 and, as it enters, to very slightly rotate this plate should the notch 92' not be in precise alignment with the latch bolt. The action of the latch bolt 105 is such as to exactly position the turret, even in the event that wear of roller 82, cam track 81, or other operating part of the mechanism has occurred, and also to positively lock plate 92, and the turret, against movement while a blank squaring operation is being effected, which operation develops forces which tend to rotate the turret. A latch bolt operating lever is indicated at 110, this lever being pivotally supported for rotation about the axis of pin 111 mounted on the supporting bracket 106. One face of the latch bolt actuating lever 110 rests against a pin 112 rigid with and downwardly projecting from the latch bolt 105 and another face of this lever overlies the actuating plate 86 and lies in the path of a pin 113 projecting upwardly from that plate. When the actuating plate is rotated in a counter-clockwise direction to retract the pawl 88 the pin 113 will, toward the end of the rotatory movement of the plate, strike the lever 110 which in turn retracts the latch bolt 105 and renders it inoperative to prevent rotation of the locking plate 92 and turret.

Shortly after a further advancing movement of the actuating plate and actuating pawl in a clockwise direction has commenced, however, the pin 113 will disengage the lever 110, allowing the latch bolt 105 to move forwardly under the influence of spring 107 until the forward end of this latch bolt engages the curved periphery of the locking disc 92. While braking or frictionally opposing forward or clockwise movement of this disc to a certain extent the latch bolt offers no positive opposition to such movement until the next succeeding notch 92' of the disc comes opposite the latch bolt, whereupon the spring 107 becomes active to force the latch bolt quickly into the notch, thus halting the movement of, and locking, the plate and turret in the desired position while the actuating pawl and disc are again being retracted. By the mechanism disclosed the turret is exactly indexed and the various blank gripping and holding members are successively moved to the four different stations which they are intended to occupy, each station being removed 90° angularly from adjacent stations.

During rotation of the turret the blank holding and gripping members 62 are caused to reciprocate radially of the turret through relatively short distances in order that the suction devices mounted thereon may be advantageously placed to initially grip the collapsed blanks and to subsequently present these blanks in the desired manner to the instrumentalities provided for acting upon them. Thus the blank holding device 62 which is positioned directly opposite the pack of blanks in the magazine is shown to be projected outwardly so that the suction devices G which it carries engage or are in very close proximity to the innermost blank so that the blank will be quickly gripped by said suction devices. As the blank, however, is moved to the position in which it is to be squared, the blank holder is retracted so that the edges of the panel b engaged by the suction devices engage, and are supported, by the vertically extending outer edges of the turret wing, to facilitate the squaring operation. After squaring, the blank is moved to a third position in which the minor end flap g is deflected and it is desirable that the blank be thrust radially outward in order that this operation may be facilitated. Eventually the squared blank is moved into the upper end of the chute 19 and at the conclusion of this final movement the blank holder and blank are drawn radially inward.

The four relative positions of the blank holders just above briefly described may be perceived from an inspection of Figure 16. These movements are effected automatically as the turret rotates, each blank holding member carrying at its lower end a roller 120 which lies within a cam track 121 of an annular cam 122 which is keyed to a sleeve 123 rotatably mounted upon the cylindrical lower end of the turret frame 60. Sleeve 123 is provided with an annular flange at its lower end which is externally toothed, the teeth of this flange meshing with those formed upon a segment 125. This segment may be manipulated to rotate cam 122 into several desired positions of adjustment. It will be understood that the rollers 120 are maintained in constant engagement with the outer face of the cam track 121 by means of the several expansion springs 70 and that the inward movements of the rollers and their associated blank holders 62, as the turret rotates, is brought about by reason of the configuration of the cam track.

It is of course necessary to provide means for rendering the suction devices G effective at certain times and ineffective at other times in order that a blank may be gripped and withdrawn from the pack at one point, carried from station to station, and held while being acted on, and thereafter released. For this purpose I provide a suction device or apparatus in which a partial vacuum is always maintained, and means connecting this device and the several blank holders 62 which includes a valve by means of which the source of reduced pressure may be alternately connected to and disconnected from the blank holders. The pipe or conduit 127 shown in Figure 7 may conveniently lead to a vacuum pump or vacuum chamber and the other end is secured to the upper and stationary member 128 of a two-part valve, the lower part being indicated at 129.

This valve is most clearly illustrated in Figures 12, 14, and 15. The lower valve member 129 rests upon and rotates with the turret and the upper valve member, which remains stationary, is pressed downwardly into close engagement with the lower valve member by means of springs 130. Both valve members are centrally apertured to receive the pin or arbor 74. Formed in the lower face of the lower valve member are four downwardly opening recesses 131 positioned 90° apart angularly and the top wall of each of these recesses is perforated, the several series of perforations being indicated at 131' in Figure 13. Formed in the under-surface of the upper valve member 128 is a circular duct or chamber 132 which is not completely annular, this duct 132 being indicated in dotted lines in Figure 14. Intermediate the adjacent ends of duct 132 is a vertical bore 134 which extends completely through the upper valve member from its upper surface to its lower surface, the upper end of this duct being open to the atmosphere.

In Figure 15 it will be seen that the duct 132 is in communication with conduit 127 leading to a source of reduced pressure, through branch duct 132' so that the desired sub-atmospheric pressure will always exist in the circular duct 132. During the rotation of the turret each of the recesses 131 will be in communication with the channel 132, by reason of the connecting perforations 131', for the major portion of its angular travel. At one point, however, i. e., where the perforations 131' pass out of register with the overlying channel 132, communication between recess 131 and channel 132 is broken. Very shortly thereafter perforations 131' will come into register with the vertical duct 134 leading to the atmosphere so that normal pressure is established therein. Immediately following this the perforations 131' will move out of register with duct 134 so that the communication with the atmosphere is broken and eventually will again register with the opposite end of the curved overlying duct 132 so that a reduced pressure is again created in recess 131. It will be understoood, of course, that this sequence of events will occur when the lower valve member is rotating in a clockwise direction (Figure 13), in which direction it normally moves with a step-by-step movement as the turret rotates.

Each of the four recesses 131 is in constant communication with duct 63 of one of the blank gripping and holding members 62, communicating conduits 137 formed in the upper portion of turret frame 60, and in the attached bracket members 138, being connected by flexible tubes 139 to the terminal ducts 72 of the blank holding members. It is believed that the operation of the means for alternately creating reduced and atmospheric pressures in the suction devices G of the turret will be clear from the foregoing description. It is of course necessary that the valve act in synchronism with the turret advancing or indexing mechanism and the valve parts are so disposed that the suction devices G are effective when presented in position to withdraw a collapsed tubular blank from the magazine and maintain their blank holding effectiveness until the squared blank has been introduced into the upper end of the chute 19, whereupon the suction devices are rendered ineffective and the blank released.

The four positions which each of the four blank holders successively occupies in a complete cycle of movement of the turret may be clearly perceived in Figure 16 and these positions are indicated by the numerals I, II, III and IV. In Position I a suction device engages the innermost blank of the pack of blanks in the magazine, in Position II the blank is in position for squaring, in Position III it is so located that the minor end flap deflecting member may operatively engage the minor end flap g and in Position IV the blank has been introduced into the chute 19.

When in Position I each blank holder is given a rapid oscillation radially of the turret, being advanced toward the pack to engage and grip a blank and thereafter being radially retracted. When it leaves Position I the blank holder is retracted and is maintained in retracted position when in Position II. As it moves to Position III the blank holder is moved radially outward and is maintained in such position during the time that it occupies Position III. When it reaches Position IV the blank holder is retracted to disengage the blank just introduced into the chute. The radial movements of the blank holders are effected by oscillating the cam 122 through a relatively small angle while the turret is stationary.

The cam 122 is shown in plan in Figure 28a, and the rollers 120 are shown in certain of the positions which they occupy when the blank holders with which they are associated are in Positions I, II, III and IV respectively. The segment 125 meshes with the teeth of the gear formed on the flange of sleeve 123, which is keyed to cam 122 as previously explained. Segment 125 is fixed on the end of arm 125' which is in turn keyed to the upper end of pin 84, previously referred to. Pin 84 revolves when lever 83 is moved by cam 80 so that cam 122 is oscillated by the same means which actuates the turret indexing mechanism. The developed cam track 81 of cam 80 is shown in Figure 28b and four successive positions of roller 82 are indicated at L', M', N' and O'. During the time that roller 82 is moving from Position L' to Position O' the pawl 88 of the turret indexing mechanism is being retracted through the action of lever 83 and plate 86, and as the roller 82 moves from Position O' to Position L' the pawl 88 is being advanced to rotate the turret. Also, during the time that roller 82 is moving from Position L' to Position O' the cam 122 is oscillated through angle R', S', T', so that the rollers 120 which occupy Positions I and IV are radially moved, the roller in Position I being first allowed to move outwardly while roller 82 is travelling from Position L' to Position M', then allowed to remain in its outer or blank engaging position during the time that roller 82 is moving from Position M' to Position N', and then retracted as roller 82 moves from Position N' to Position O'. During the travel of roller 82 from N' to O' roller 120, Position IV, is retracted to cause the blank holder in Position IV to disengage the blank which it has just placed in chute 19. Initially the cam 122 has its peak 122a disposed on line S'—T', this peak being moved to line S'—R' while the turret is stationary and returned to line S'—T' while the turret is being indexed.

It is while any blank holder is in Position II that the blank is squared with the assistance of a blank squaring member which carries suction devices G'. The manner in which the blank is squared has previously been described and need not be repeated. It need only be said that the squaring device is, in details of construction, generally similar to the four blank gripping or holding members 62, carrying a plurality of suction devices G' and being connected to a vacuum chamber or pump by means of a flexible conduit or hose 150, there being a control valve 151 in this suction line so that the suction devices G' may be alternately rendered operative and inoperative. This control valve is illustrated in Figures 29 and 30. It comprises essentially a vertically slidable valve member 152 provided with two ducts 153 and 154 respectively, the first mentioned duct passing completely through the slidable valve member and, in the position in which it is shown in Figure 30 bringing into communication the two adjacent ends of the conduit 150 which connects the squaring member 18 to the source of vacuum so that the suction devices G' are directly connected to the vacuum source and thereby rendered operative. The duct 154 extends only partially through the valve member 152 and by means of a branch duct 154' is caused to communicate at all times with the atmosphere, through the spring recess 155, screen 156 and outlet port 157 formed in the valve casing. A roller 158 carried by the valve member 152 at its lower end rests upon the periphery of a cam 159 and is maintained in close engagement with the surface of that cam at all times by the downwardly acting spring 160. As the cam 159 rotates the slidable valve member 152 will be vertically oscillated to bring ducts 153 and 154 alternately into communication with that portion of conduit 150 which leads to the blank squaring member 18 so that the suction devices of that member are alternately connected to the source of vacuum and to the atmosphere.

The mechanism for actuating the cam 159 is not illustrated and it need only be said that this mechanism derives its power from the power shaft 13 and that it is of such character as to bring about properly timed movements of the valve 152, the movements of which valve of course are synchronized with the swinging movements of the blank squaring member 18 so that the blank is gripped and disengaged at the proper times.

The blank squaring member 18 is illustrated in detail in Figures 20 to 25 inclusive, also the operating mechanism therefor. It will be perceived that the base of the blank squaring member is mounted upon a bracket 162 and rigid with this bracket are parallel vertically disposed sleeves 163 and 164. Within sleeves 163 and 164 are pins 165 and 166, the lower ends of these pins being rigidly secured in the free ends of arms 167 and 168. Upon the upper ends of pins 165 and 166 are washers and holding nuts which prevent dislodgment of the bracket 162 from these pins.

Arms 167 and 168 are rigidly attached to the upper ends of vertical shafts 169 and 170, rotatably supported on the frame of the machine. A compound gear comprising integral gears 172 and 175 is rotatably mounted on short shaft 169 and the teeth of gear 172 mesh with the teeth of gear 173 which is rigid with shaft 170 so that shaft 170 will be rotated when the compound gear 172, 175 is rotated. The teeth of gear or pinion 175 mesh with those of a segment 176 fixed upon the end of an operating lever 177 mounted for pivotal movement about the axis of a pin 178 supported by the frame. The opposite end of this lever carriesa roller 179 which lies in the cam track 180 of a cam 181. It will be clear that rotation of cam 181 will result in oscillation of the segmental rack 176 and rotation of stub shafts 169 and 170 which in turn cause swinging movements of the arms 167 and 168 and oscillation of the blank squaring member 18 from one extreme position to the other in the manner previously described. Blank squaring member 18 is of course actuated only while the turret is stationary, occupying the position in which it is shown in Figure 7 and in Figure 23, when the turret is rotated.

The blank holding and gripping member 62 which occupies Position III (Figure 16) presents a blank to the means for downwardly deflecting the upper minor bottom flap g. This means comprises an arm 185 pivotally mounted upon the horizontal pin 186 rigid with the bracket 76, the inner end of this arm being downwardly curved as indicated at 185' and comprising a hook-like member which, when swung downwardly from a position above the container, in Position III, to the position in which it is shown in full lines in Figure 12, engages the bottom flap g and deflects it downwardly into the positions in which it is shown in Figure 12. The arm is thereafter raised and remains in raised position until a further squared container is brought into position to be operated on thereby. The actuating arm may be shifted bodily in a vertical direction. In Figure 12 the arm is shown to be positioned to act upon blanks which are to be folded into containers of one pint capacity. When the longer (quart) blanks are passing through the machine the pin 18 is lifted to Position 186a and, when shorter (one-half pint) blanks are being passed through, the pin 186 is lowered to Position 186b. The means for actuating the arm 185 comprises a vertically movable rod 187 within the vertical portion of housing 76, the lower end of this arm having mounted thereon a bracket 188 which rests upon a cam 190 mounted upon shaft 30. The position rod 187 is cut away at 187' to receive a roller 191 mounted upon the end of arm 186 so that the vertical reciprocatory movements of rod 187 are communicated to the rocking arm 185 without frictional loss.

As a squared blank is moved from Position III to Position IV its outer leading corner strikes a guide member S which causes the blank to assume the shape, in horizontal cross-section, of a diamond. Due to variations in the nature of the paper used and variations in relative humidity of the atmosphere surrounding the machine the blanks are sometimes not exactly squared at the conclusion of the squaring operation. To ensure that no blank shall jam when presented to the chute the guide S is provided, this guide slightly distorting all blanks which pass it, in the same manner and to the same extent so that the possibility of jamming at the chute is eliminated.

The squared container blank with downwardly deflected minor bottom flap is, when the gripping devices engaging the same have been moved to Position IV of the turret, precisely positioned in the upper end of the chute 19, as has previously been stated. At its upper end the chute is provided with a gate indicated at 200 which is swung laterally into the position in which it is shown in chain lines in Figure 17 to permit the introduction of the squared blank and is thereafter returned to the position in which it is shown in full lines in Figure 16 in order that the blank may be engaged and supported upon all faces. The blank is then ready for movement downwardly through the chute. It will be perceived that the gate 200 is carried by arms 201 rigid with a vertically elongated block 202 which in turn is fixed upon a vertically extending pin 203 rotatably carried by the frame. At its lower end pin 203 carries a toothed segment 204 the teeth of which mesh with those of a segment 205 mounted upon a lever 206, pivotally mounted upon a pin 207 carried by the frame and having at its opposite end a roller 208. Roller 208 lies in a cam track 209 of a cam 210 mounted upon shaft 30 and as shaft 30 rotates, thus rotating cam 210, the lever 206 will be caused to periodically oscillate from the position in which it is shown in dotted lines in Figure 16 to the position in which it is shown in full lines in Figure 17, and in the reverse direction. When swung to the position in which it is shown in Figure 17 the gate is caused to open and when returned to the position in which it is shown in Figure 16 the gate 200 is closed. The gate operating mechanism is of course synchronized with the movements of the turret and other operating parts of the machine.

After the squared container has been thus placed in the upper end of the chute 19, and has been released by the blank holding member which has conveyed it to that position, it is positively moved downwardly in the chute by means of a pusher and onto a solid mandrel lying below the discharge end of the chute and precisely positioned to receive the blank. This pusher and its operating means will be perceived in Figures 18, 19 and 31, where the pusher member is indicated by the numeral 215. It is a flat member with a horizontal portion 215', an upwardly and downwardly turned portion which terminates in a pusher head 215². The portion 215' of the pusher is supported on pins 216 which are carried by chains 217 and 218 respectively, these chains being disposed in a common vertical plane and passing around upper sprockets 219 and 220 and lower sprockets 221 and 222, the upper sprockets being idler sprockets provided for guiding purposes only and the lower sprockets being driven by suitable mechanism, at the desired speed, by mechanism which it is not necessary to describe in detail. It may be said, however, that the sprockets are connected to a moving part of the machine through a friction clutch so that in the event that a squared blank becomes jammed in the chute the clutch will slip. Slipping of the clutch in turn causes actuation of an electrical switch which opens the motor circuit and stops the machine.

The chains are driven in such manner that the pins 216 are moved vertically simultaneously and at the same annular velocity and naturally each pin travels in an endless path. As a result the pusher 215 will also be moved in an endless path and will always be disposed in the same generally horizontal direction. The diameters of the sprockets are such that, as the pusher moves downwardly, the pusher head 215² moves downwardly through the chute 19 but at its lower end is withdrawn laterally from the chute as the pins 216 pass around sprockets 221 and 222 and, as the pusher moves upwardly the pusher head 215² lies entirely without the chute and, as the pins 216 pass around the upper sprockets 219 and 220 the pusher head is again brought into position overlying the chute and directly above any squared container which may have been disposed in the upper end of the chute by the turret. The wall of the chute is of course slotted vertically to receive the pusher and is laterally apertured adjacent its lower end to permit the pusher head and the pushing attachment which will now be described to be readily withdrawn. The pusher head attachment is shown in Figures 18 and 19 and comprises a horizontally disposed plate 225 pivoted at 226 to a bracket 227 secured to one face of the pusher head 215², plate 225 being normally depressed so as to occupy the position shown in Figure 19 by an expansion spring 228. The downward movement of plate 225 being limited by contact of an abutment nut 229 upon the upper surface of bracket 227, abutment nut 229 being adjustably positioned upon the upper end of a threaded rod 230, the lower end of which rod is pivotally connected to a member 231 rigidly secured to the plate 225. As the pusher is caused to descend plate 225 will engage the upper edge of panel b of the squared blank, the flap g having been inwardly deflected, and the force exerted by the pusher upon the squared blank to move the squared blank or partially finished container downwardly in the chute is transmitted through plate 225 to the panel b.

The partially finished container delivered by the chute is received by mechanism for effecting the folding and sealing of its bottom flaps and in Figures 33, 34 and 35 the sequence of folding operations is indicated. The minor bottom flap g has already been downwardly folded wholly or in part by the mechanism described previously. The remaining flaps still project upwardly in alignment with the side panels to which they are hingedly connected. In the next operation the minor bottom flap k is inwardly folded and the major bottom flaps f and h are simultaneously spread apart in horizontal position. Then the major bottom flap h is coated on its upper surface with an adhesive and folded into the position shown in Figure 34, so as to overlie minor flaps g and k. Finally the major bottom flap f is folded over the flap h so that the bottom forming operations have been completed. The mechanism for effecting these operations will now be described.

A mandrel carrier is generally indicated at 240, this carrier having spaced bearings 241 rotatably mounted upon a horizontal axle 242 the ends of which axle are in turn rotatably mounted in bearings rigid with or supported by the side members of the frame. The mandrel carrier supports eight tubular bearings 243, which bearings are disposed radially, and are equidistantly spaced angularly. Within each bearing is positioned a cylindrical mandrel stem 244 and secured to the outer end of each such stem is a mandrel 245. The mandrel is generally rectangular in longitudinal and transverse section and its outside dimensions are such that certain portions of it snugly fit against the inside walls of a squared container, sufficiently close to prevent any substantial lateral movement of the squared blank relatively to the mandrel. Preferably each mandrel is provided with a plurality of laterally projecting lugs or protuberances such as indicated at 245' in Figure 40, there being a series of these protuberances disposed along the top or outer end of each mandrel and a second series adjacent the inner end of each mandrel, the mandrel being designed to support a squared blank at its ends, intermediate portions of the walls of the blank being unsupported. The axes of the mandrels and the mandrel stems upon which they are mounted are disposed in a common vertical plane which is normal to the mandrel carrier supporting shaft 242 and this plane includes the axis of the chute 219 so that, as the mandrel carrier is revolved, each mandrel passes successively beneath the discharge end of the chute 19 and in position to receive a squared container. The means provided for actuation of the mandrel carrier is so designed that the mandrels are successively presented to the lower end of the chute and in exact alignment therewith, to receive a blank, the actuating means positively locking the carrier while a squared blank is being moved by the pusher out of the chute and onto the mandrel. This means will now be described.

The mandrel carrier 240 has rigidly secured thereto a disc or annular plate 248 disposed in a plane parallel to the plane which includes the axes of the mandrel stems and this plate carries a series of rollers 249, the outer surfaces of which are frustoconical. There are eight of these rollers, one for each mandrel and the rollers are equidistantly spaced from the axis of shaft 42 and equidistantly spaced angularly one from the other. Mounted on shaft 13 is a cam 250 the cam track 251 of which is shaped as shown in Figures 41, 43 and 44 and which is adapted to successively receive the rollers 249 previously referred to. Shaft 13 is supported in bearings 252 and these bearings are so designed as to prevent any axial movement of the shaft upon which the cam 250 is mounted. It will be observed that the cam track 251 extends only part-way around the cam and that the cam is provided with transverse members 253 having bevelled edges 253'. The cam is so designed that as one pin or roller 249 is in position to enter cam track 251 the next preceding pin or roller 249, which has emerged from the delivery end of the cam track, is in engagement with the bevelled surface 253' of plate 253. The distance between surface 253' and the portion of the cam track 251 which lies in the same plane through the axis of shaft 13 is exactly equal to the distance between the adjacent elements of adjacent rollers 249 intersected by this plane, so that there is no lost motion by the rollers and cam when the rollers are so positioned with respect to the cam and the cam is not rotating. By means of the shaft 13 the cam is given a constant motion, and for each rotation of the cam the roller carrying plate 248 and hence the mandrel carrier, is moved angularly through the angular distance between rollers, which is the same as the angular distance between mandrels and, as has been previously explained, the plate 248 and mandrel carrier 240 are positively locked against rotation during the "dwell" of the cam. By means just described the mandrels may be successively brought into alignment or register with the chute 19, and locked in such position during the mandrel loading operation.

The cam track 251 of the constantly rotating cam 250 extends around the axis of shaft 13 an angular distance of 135° and the locating members 253 extend the balance of the angular distance about the axis of this shaft, or 225°. Therefore, the period of time during which the mandrel carrier is locked amounts to $225/360$ of the time consumed in a complete revolution of shaft 30, and the speed of the shaft is so regulated that the squaring of one blank and feeding to a mandrel of a previously squared blank may be performed during this locked or "dwell" period. Considerably less time is expended in advancing the mandrel carrier one step, i. e., $135/360$ of the entire time consumed in a complete cam revolution.

A mandrel, positioned in registry with the lower end of the chute, is shown in Figure 38 upon an enlarged scale. Mounted upon this mandrel is the squared blank in the position in which it has been moved by the pusher. In this position the minor bottom flap $g$ is inclined, having sprung upwardly part-way to a vertical position by the resilience of the paper sheet, after the pusher has disengaged it. The remaining end flaps $f$, $l$ and $k$ are still upstanding. Prior to the next advancing movement of the mandrel in the direction of the arrow Y it is necessary to move the end flap $g$ downwardly onto the upper surface of the mandrel and also to maintain it in its downwardly folded position for a short period during the initial travel of the mandrel so that it will pass beneath the member 260 and not be caught by this member. The means for folding down flap $g$ comprises a curved blade 261 which operates in a substantially horizontal plane just above the level of the top of the mandrel and which may be moved in the position in which it is shown in full lines in Figure 38 to the position in which it is shown in dotted lines in that figure. Blade 261 is mounted upon the end of a lever 262 which extends upwardly and is secured to the gate operating lever 206 so that the blade 261 is advanced over the mandrel when the gate operating lever 206 is actuated to operate the gate of the chute. The movement of lever 206 is so timed that the blade 261 moves forwardly just prior to advancement of the mandrel and remains in its forward position during the time that the mandrel is moving from the position in which it is shown in full lines in Figure 38 to the position in which it is shown in dotted lines in this figure, thus ensuring that the flap $g$ does not rise during this movement to permit its leading edge to ride up the vertical surface of the member 260 but on the other hand making certain that the leading edge passes underneath member 260.

The lever 262 is constructed in two parts pivotally connected together by the pin 264, these parts being frictionally held in the relative positions in which they are shown in Figure 36 by a plunger 265 pressed downwardly by means of a spring 266, both spring and plunger being located in a bore formed in the upper portion of the arm and the lower surface of the plunger resting against the upper surface of the lower portion of the arm 262. In the event that a squared blank is not completely positioned over a mandrel by a pusher, and a side wall of this blank lies in the path of movement of the blade 261, the arm 262 will "break," its upper portion moving angularly but the lower portion not advancing. This prevents penetration of the paper wall of the blank by the forward edge of the blade 261 and jamming of the machine.

The member 260 previously referred to is, as viewed in plan, triangular, or at least has a generally triangular blade portion at its lower end, which is designated 260'. The inclined edges $260^2$ of member 260' lie in the paths of movement of the two major bottom flaps and comprise camming edges for outwardly deflecting these bottom flaps as the squared blank passes beneath member 260. Naturally the minor bottom flap $k$ is downwardly folded by its contact with the undersurface of the member 260. After the mandrel has been moved beneath member 260 the four bottom flaps occupy the positions in which they are shown in Figure 33. The minor bottom flaps *g* and *k* are maintained in the positions shown during a further angular movement of the mandrel by the inclined flap holding blade 267 the upper end of which is fixed to a rotatable supporting member 268 mounted for rotation about the common axis of the pin 269. A tension spring 270, one end of which is connected to pin 271 extending upwardly from member 260′ and the other end of which is connected to a bracket 272 rigid with member 267, normally urges the flap holding blade 267 into the position in which it is shown in Figures 36 and 39, this blade bearing closely upon the flaps *g* and *k* during the time that the mandrel is beneath it and maintaining these flaps downwardly folded against the mandrel. The positions of gluing rollers relatively to the mechanism just described is indicated by the dotted circle 272 in Figure 38 and it is while the mandrel is passing beneath these rollers that an adhesive is applied to the horizontal upper surfaces of the major bottom flaps *f* and *h*. The gluing mechanism is shown in Figures 45 and 46, the gluing rollers being indicated at 275. These rollers are rotatably supported in a frame 276 which frame may be rocked about stationary shaft 277, upon which it is supported, to raise the rollers 275 out of operative position in the event that a mandrel shall pass beneath the rollers upon which no squared-out container has been positioned.

Lifting of the frame 276 which carries the glue applying rollers is effected by means of a cam 278 which underlies the frame supporting roller 279. When cam 278 is moved upwardly and to the left (Figure 45) in the cam slide in which it is mounted, the glue roller frame will be lifted and when drawn in the opposite direction by means of the spring 280 the glue applying rollers will be lowered to operative position. A lever for operating cam 278 is indicated at 281, being pivotally mounted upon a stud 282 fastened to a stationary frame part. The lower end of this lever will be struck by an abutment member 283, carried by a blank detecting rod 284 in the event that a mandrel upon which no blank is mounted is moved under the gluing rolls. It will be perceived that the detecting rod 284 is mounted for longitudinal sliding movement in a horizontally extending support 285 and that a spring 286, having one end connected to the detecting rod and the other end to member 285, normally tends to thrust the detecting rod toward a mandrel in line with the same so that the curved leading end of the detecting rod will contact with a blank if a blank is mounted on the mandrel and its movement thus stopped partly. In the event no blank is present, the detecting rod will move into a recess formed in the side of the mandrel, thus making a longer movement. At its outer end the detecting rod carries a pin 287 which normally engages a curved restraining plate 288 and prevents inward movement of the detecting finger. This plate 288 terminates, however, just in front of the cam operating dog or lever 281 so that, in the event that no blank is mounted upon the associated mandrel as the pin 287 clears the end of the restraining plate, the detecting rod 284 may move inwardly, thus bringing the abutment 283 mounted on this rod into alignment with the cam operating lever 281. The abutment will strike the lower end of the lever, rotate this lever, actuate the cam 278 and lift the frame 276, the abutment 283 then passing under the lower end of the lever 281 and, by reason of its length, maintain this lever in cam advancing position until the mandrel has passed the gluing rollers, whereupon the lever is again released and the cam is retracted by the spring 280, allowing the frame 276 to descend. It will be appreciated that inasmuch as the detecting rod 284 moves with the mandrel carrier one such rod must be provided for each mandrel, the rod travelling with the mandrel as the mandrel carrier rotates.

During the time that the major bottom flaps *f* and *h* are being coated upon their upper surfaces with an adhesive, the lower surfaces of these bottom flaps rest upon slides 290 and 291 respectively, these slides being mounted for movement transversely of the mandrel carrier upon supporting rods 292 carried by the mandrel carrier. There are two such slides associated with each mandrel and the action of the slides will be most clearly understood from an inspection of Figure 42 wherein a number of slides are shown, also the operating cams for these slides, which cams are indicated at 293 and 294. In Figure 42 blanks without spread major bottom flaps are indicated in chain lines and the direction of movement of the mandrel carrier is assumed to be such that the blanks are progressing from left to right in this figure. In the first position both major flaps are shown spread laterally upon the supporting slides and the minor bottom flaps are still maintained in downwardly folded position upon the mandrel top by the holding down blade 267 previously described (see Figure 42). It is when the flaps are so positioned that the adhesive is applied to the major bottom flaps. As the mandrel carrier and slides advance toward the right, slide 291 is advanced by the cam 294 and passes over the mandrel top, folding down the major flap *h* over the two minor flaps, the slide 290 remaining inoperative. When the mandrel carrier and slides further advance the cam 293 becomes active to advance slide 290 over the mandrel and to fold down the remaining major bottom flap, the slide 291 being similtaneously retracted. Thereafter the rotation of the mandrel carrier is continued with a step-by-step movement, the slide 290 remaining above the mandrel and holding between it and the mandrel all four of the bottom flaps, these flaps being held in close engagement, and during this time heat is applied to harden and set the adhesive with which the major bottom flaps have previously been coated.

When each mandrel has been advanced by the mandrel carrier to its last position next preceding the position in which it is in register with the chute 19 the slide 290 is retracted by cam 293 so that the completely formed bottom is uncovered. At this point a transfer device, generally indicated at 300, becomes active to remove the container as so far completed, this transfer device having a reciprocable rod 301 with a suction device 302 on its end, which suction device is energized as the rod is moved by mechanism which need not be described, into the position in which it is shown in Figure 11, that is, into engagement with the completely formed bottom of the container. The container bottom is thus gripped by the suction device, after which the rod 301 is retracted and the container lifted from the mandrel. Thereafter the mandrel moves to a position beneath the chute and is ready to receive a further squared-out blank, this cycle of operations being rapidly repeated and all parts of the mechanism being synchronized so that the blanks are moved in regular sequence from the magazine to the transfer mechanism and are delivered by this mechanism to a further mechanism for acting upon the same, for instance to a coating apparatus.

The mandrels are radially moved during the rotation of the mandrel carrier, outward movement of each mandrel being effected by means of a coiled spring 305 interposed between the surface of the mandrel and the end of the bearing which houses the mandrel stem (Figure 32). Inward movement of each mandrel at the desired point in its travel is effected by a cam 306 mounted upon the mandrel carrier shaft, the cam being keyed to the shaft 242 and having a cam track 307 to receive the rollers 308, one such roller being mounted upon the inner end of each mandrel stem. The cam is so shaped that the mandrel which is in register with the chute is drawn inwardly for a short distance against the action of the associated spring and it is maintained in substantially this position for a further rotation of the mandrel carrier through an angle of nearly 90°. Thereafter the roller 308 disengages the cam and the mandrel is pressed outwardly by the spring associated therewith so that the freshly folded and adhesive coated bottom flaps of the blank are tightly pinched between the mandrel end surface and the slide 290. For approximately 180° in the further travel of the mandrel carrier this condition exists but as each mandrel approaches the discharge position its roller again engages cam 306 and the mandrel is retracted, thus enabling slide 290 to be freely retracted by cam 293 to uncover the bottom of the partially formed container, rendering it accessible to the suction device 302.

While primarily the mechanism is designed to square-out and secure the bottoms of container blanks of the type illustrated it embodies certain features and methods which may be successfully utilized in the fabrication of containers of somewhat different type. To that end the design and arrangement of the component elements of the invention may be considerably modified without departing from the essentials thereof.

Having thus described the invention what is claimed as new and desired to be secured by Letters Patent is:

1. Means for squaring-out a collapsed tubular container comprising panels and intermediate scored portions, including means for holding one panel in fixed position, and means for swinging two other panels simultaneously about one edge of the fixed panel while maintaining said other panels in parallel relationship, for the purpose set forth.

2. Means for squaring-out a collapsed tubular container comprising flat panels and intermediate scored portions, including means for supporting the container in collapsed condition with two scored portions in closely adjacent parallel relationship, and second means for bending the container while in collapsed condition about said closely adjacent scored portions.

3. Means for squaring-out a collapsed tubular container comprising panels connected by intermediate scored portions, including means for holding one panel in fixed position with the container collapsed, and second means for engaging and gripping a second panel, moving said second panel along an arcuate path until two scored portions are in closely adjacent parallel relationship, and thereafter bending the container about said closely adjacent scored portions.

4. In a machine for fabricating containers, in combination, means for supporting a collapsed tubular container with foldable bottom flaps uppermost, means for engaging and squaring-out the container, means for downwardly bending one of the bottom flaps, and means for thereafter placing the squared-out container, with downwardly bent bottom flap, on a mandrel.

5. In a container fabricating machine, in combination, mechanism for squaring-out a collapsed container with bottom flaps uppermost, means positioned above the container and mounted for downward movement into contact with one of said bottom flaps, for downwardly and inwardly deflecting said flap, and means for thereafter placing the squared-out container, with downwardly bent bottom flaps, on a mandrel.

6. In a container fabricating machine, in combination, means for squaring-out an inverted collapsed tubular container having independently foldable bottom flaps, means for inwardly bending one of said bottom flaps, and means for thereafter forcing said container over a mandrel, top foremost.

7. The combination set forth in claim 6 in which said last mentioned means includes a pusher having a resiliently supported member to engage the inwardly deflected container flap.

8. In a container fabricating machine, in combination, means for squaring-out a collapsed tubular blank and inserting the same into a chute, a mandrel in axial alignment with the chute, and a pusher for moving the container through the chute and onto the mandrel, said pusher being supported on endless chains outside of the chute and being moved thereby into the chute at one end, through the chute and laterally out of the chute at the other end thereof, the pusher being moved during its return movement in a direction parallel to the chute but in a path lying wholly without the chute.

9. In a container fabricating machine, in combination, a chute, a mandrel in alignment with the chute, means for squaring a collapsed tubular blank and inserting the squared blank into the chute, and means for pushing the squared blank through the chute, said last mentioned means including a pusher, and means positioned laterally of the chute for moving the pusher in a closed orbit, the operation of said means causing the pusher to enter the chute at one point, move through the chute toward the mandrel to push the container, withdraw laterally from the chute at the end of its working stroke, and return to chute entering position along a path wholly without the chute.

10. A machine for fabricating containers comprising a chute, a plurality of mandrels adapted to be brought successively into alignment with the chute, means for squaring a container blank and passing said blank through the chute and onto the mandrel, means for folding inwardly one flap of the squared blank while the mandrel is stationary and means for folding inwardly a second flap when the mandrel is moved.

11. A machine for fabricating containers comprising a chute, a plurality of mandrels adapted to be brought successively into alignment with the chute, means for squaring a container blank and passing said blank through the chute and onto the mandrel, means for folding inwardly over the mandrel top two opposed upwardly projecting bottom panels of the squared blank, and means for maintaining said flaps in folded position during a preliminary movement of the mandrel away from the chute.

12. A machine for fabricating containers comprising a chute, a plurality of mandrels adapted to be brought successively into alignment with the chute, means for squaring a container blank and passing said blank through the chute and onto the mandrel, means for folding inwardly over the mandrel top two opposed bottom flaps of the squared blank, a device for holding said flaps in folded positions as the mandrel leaves the chute, and means for folding down a third flap onto the previously folded flaps, said last mentioned means engaging and laterally deflecting said device when moving on its working stroke.

13. The combination set forth in claim 12 in which said device comprises a blade-like member supported for pivotal movement adjacent the bottom of the chute and resilient means for normally maintaining said member in flap holding position.

14. In a machine for fabricating paper containers, in combination, a chute, means for squaring a collapsed tubular blank and advancing it through the chute, and a solid mandrel movable into alignment with the chute to receive a squared blank ejected from the chute, said mandrel having enlarged ends and a reduced intermediate portion.

15. The combination set forth in claim 14 in which said mandrel is provided with laterally projecting container engaging lugs at its ends.

16. The method of squaring a collapsed blank having four rectangular panels and four exteriorly scored portions connecting the panels, two scored portions of the collapsed blank being in contact, comprises folding two mutually facing panels relatively to the other two about said contacting scored portions and thereafter squaring the blank.

17. The method of squaring a collapsed blank having four rectangular panels and four exteriorly scored portions connecting the panels, two such scored portions being in contact, which comprises moving one panel angularly about an opposed panel to bring the other pair of scored portions into contact and thereafter swinging two panels simultaneously relatively to the other two panels about the second pair of scored portions, to flex such portions.

18. The method of squaring a collapsed blank having four rectangular panels and four exteriorly scored portions connecting the panels, two such scored portions being in contact, which comprises moving one panel angularly about an opposed panel to bring the other pair of scored portions into contact, then swinging two panels simultaneously relatively to the other two panels through an angle of approximately 90° about the second pair of scored portions, and thereafter squaring the blank.

19. In a machine for fabricating containers, in combination, means for supporting a collapsed tubular blank in a predetermined position, a rotatable turret, a blank holding member carried by the turret and movable radially thereof, means for intermittently rotating the turret about its axis, and means for positively locking the turret against movement when said first mentioned means is inactive.

20. In a machine for fabricating containers, in combination, a magazine for collapsed tubular containers, a rotatable turret adjacent the discharge end of the magazine, a blank holding member mounted on the turret and movable radially thereof, a suction gripper carried by the blank holder, a restricted conduit leading from said gripper to a source of reduced pressure, and a single valve for opening and closing said conduit to render said gripper effective and ineffective.

21. In a machine for fabricating containers, in combination, means for removably supporting a collapsed tubular container, mechanism for gripping one portion of a container so supported, removing said container from said means and transporting the same to a second position to be acted upon, and a second mechanism for gripping another portion of the container at said second position while said container is still gripped by said first mechanism and squaring out the collapsed container by swinging said other portion of the container through an arcuate path greater than 180°, with respect to said first mentioned portion.

22. In a machine for fabricating containers, in combination, means for removably supporting a collapsed tubular container, mechanism for gripping one portion of a container so supported, removing said container from said means and transporting the same to a second position to be acted upon, and a second mechanism for gripping another portion of the container at said second position while said container is still gripped by said first mechanism and squaring out the collapsed container by swinging said other portion of the container through an arcuate path of approximately 270° with respect to said first mentioned portion.

23. Container squaring out mechanism comprising a suction gripper for engaging and holding stationary a container panel, a second suction gripper for engaging a second panel of such container, and means for relatively moving said grippers through an angular distance greater than 180°.

24. Container squaring out mechanism comprising a suction gripper for engaging and holding stationary a container panel, a second suction gripper for engaging a second panel of such container, and means for relatively moving said grippers through an angle of approximately 180° while maintaining the faces of the grippers in parallelism, and thereafter relatively moving the faces of the grippers into angular relationship with each other.

25. Container squaring out mechanism comprising means for rigidly supporting one panel of a multipanel collapsed container, and second means for gripping a second panel, said second means being movable around one edge of the support for the first panel, and through the plane of a panel supported thereon, to flex the container about said edge.

26. In a machine for fabricating containers, in combination, a solid mandrel for interiorly supporting a squared out tubular paper container, a chute aligned with the mandrel for receiving containers and guiding them onto the mandrel, said chute having a laterally swinging portion displaceable to permit lateral introduction of a squared out container, and means for squaring out a container and introducing it into the chute while said swinging portion is laterally displaced.

27. In a container fabricating machine, in combination, means for supporting a container for movement along a fixed path, a container flap gluing device normally positioned to be contacted by the flaps of containers moved along said path by said means, and mechanism for displacing said device to inoperative position when a container supporting means having no container thereon approaches said device, said mechanism comprising a member movable with said means and having a container engaging portion and an abutment, resilient means normally urging said member in container engaging direction, and a gluing device displacing means adapted to be engaged and actuated by said abutment when said member is moved into one position due to absence of a container from the associated container supporting means.

28. The combination set forth in claim 27 in which the gluing device displacing means comprises a sliding cam.

29. The combination set forth in claim 27 in which the gluing device displacing means comprises a cam, and a lever operatively connected thereto, the other end of the lever being adapted to be struck by the abutment mentioned.

30. In a machine for fabricating containers, in combination, a magazine for blanks to be squared, a turret adjacent the discharge end of the magazine and mounted for movement about a fixed axis, a blank gripping element carried by the turret and supported for movement radially thereof, means for intermittently moving the turret angularly about its axis, and means for radially adjusting the blank gripping element when the turret is stationary.

31. In a machine for fabricating containers, in combination, a magazine for blanks to be squared, a rotatable turret adjacent the discharge end of the magazine, a blank gripping element carried by the turret and supported for movement radially thereof, means for intermittently revolving the turret about its axis, and means for radially adjusting the blank gripping element when the turret is stationary, said last mentioned means comprising a cam revoluble about the axis of the turret.

RACY D. BENNETT.
CHARLES Z. MONROE.